US011666894B2

(12) United States Patent
Masuda et al.

(10) Patent No.: US 11,666,894 B2
(45) Date of Patent: Jun. 6, 2023

(54) STRUCTURED CATALYST FOR CO SHIFT OR REVERSE SHIFT AND METHOD FOR PRODUCING SAME, CO SHIFT OR REVERSE SHIFT REACTOR, METHOD FOR PRODUCING CARBON DIOXIDE AND HYDROGEN, AND METHOD FOR PRODUCING CARBON MONOXIDE AND WATER

(71) Applicant: FURUKAWA ELECTRIC CO., LTD., Tokyo (JP)

(72) Inventors: Takao Masuda, Sapporo (JP); Yuta Nakasaka, Sapporo (JP); Takuya Yoshikawa, Sapporo (JP); Sadahiro Kato, Tokyo (JP); Masayuki Fukushima, Tokyo (JP); Hiroko Takahashi, Tokyo (JP); Yuichiro Banba, Tokyo (JP); Kaori Sekine, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 181 days.

(21) Appl. No.: 16/698,579

(22) Filed: Nov. 27, 2019

(65) Prior Publication Data

US 2020/0114338 A1 Apr. 16, 2020

Related U.S. Application Data

(63) Continuation of application No. PCT/JP2018/021086, filed on May 31, 2018.

(30) Foreign Application Priority Data

May 31, 2017 (JP) .............................. JP2017-108630

(51) Int. Cl.
*B01J 29/14* (2006.01)
*C01B 32/40* (2017.01)
(Continued)

(52) U.S. Cl.
CPC ............... *B01J 29/14* (2013.01); *B01J 29/46* (2013.01); *B01J 29/68* (2013.01); *B01J 29/7669* (2013.01);
(Continued)

(58) Field of Classification Search
CPC ... B01J 29/14; B01J 29/46; B01J 29/68; B01J 29/7669; B01J 35/0013; B01J 35/006;
(Continued)

(56) References Cited

U.S. PATENT DOCUMENTS 3,898,180 A   8/1975  Crooks et al.
4,552,855 A   11/1985 Ozin et al.
(Continued)

FOREIGN PATENT DOCUMENTS

AU   2012324802 A1   6/2014
CA      2256515 A1  12/1997
(Continued)

OTHER PUBLICATIONS

Wen et al. "Enhanced catalytic performance of Co/MFI by hydrothermal treatment" Catalysis Letters vol. 86, Nos. 1-3, Mar. 2003 (Year: 2003).*

(Continued)

*Primary Examiner* — Steven J Bos
*Assistant Examiner* — Syed T Iqbal
(74) *Attorney, Agent, or Firm* — Dorsey & Whitney LLP

(57) ABSTRACT

Provided are a structured catalyst for CO shift or reverse shift that can realize a long life time by suppressing the decline in function, a method for producing the same, a CO shift or reverse shift reactor, a method for producing carbon (Continued)

dioxide and hydrogen, and a method for producing carbon monoxide and water. The structured catalyst for CO shift or reverse shift (1) includes a support (10) of a porous structure composed of a zeolite-type compound, and at least one CO shift or reverse shift catalytic substance (20) present in the support (10), the support (10) has channels (11) connecting with each other, and the CO shift or reverse shift catalytic substance (20) is present at least in the channels (11) of the support (10).

17 Claims, 4 Drawing Sheets

(51) Int. Cl.

| | |
|---|---|
| *B01J 29/46* | (2006.01) |
| *B01J 29/68* | (2006.01) |
| *B01J 29/76* | (2006.01) |
| *B01J 35/00* | (2006.01) |
| *B01J 37/00* | (2006.01) |
| *B01J 37/02* | (2006.01) |
| *B01J 37/10* | (2006.01) |
| *B01J 37/18* | (2006.01) |
| *C01B 3/16* | (2006.01) |
| *C01B 5/00* | (2006.01) |

(52) U.S. Cl.
CPC ......... *B01J 35/006* (2013.01); *B01J 35/0013* (2013.01); *B01J 35/0066* (2013.01); *B01J 37/0018* (2013.01); *B01J 37/0205* (2013.01); *B01J 37/10* (2013.01); *B01J 37/18* (2013.01); *C01B 3/16* (2013.01); *C01B 5/00* (2013.01); *C01B 32/40* (2017.08); *B01J 2229/14* (2013.01); *B01J 2229/186* (2013.01); *C01B 2203/0283* (2013.01); *C01B 2203/1052* (2013.01); *C01B 2203/1058* (2013.01); *C01B 2203/1076* (2013.01)

(58) Field of Classification Search
CPC ................ B01J 35/0066; B01J 37/0018; B01J 37/0205; B01J 37/10; B01J 37/18; B01J 2229/14; B01J 2229/186; B01J 29/035; B01J 29/76; C01B 3/16; C01B 5/00; C01B 32/40; C01B 2203/0283; C01B 2203/1052; C01B 2203/1058; C01B 2203/1076; C01B 3/48
See application file for complete search history.

(56) References Cited

U.S. PATENT DOCUMENTS

| | | | |
|---|---|---|---|
| 5,026,673 A | 6/1991 | Gates et al. | |
| 5,236,575 A | 8/1993 | Bennett et al. | |
| 5,275,720 A | 1/1994 | Ward | |
| 5,849,652 A | 12/1998 | Davies et al. | |
| 5,994,603 A | 11/1999 | Mohr et al. | |
| 6,040,259 A | 3/2000 | Mohr et al. | |
| 6,831,203 B1 | 12/2004 | Mohr et al. | |
| 6,881,703 B2 | 4/2005 | Cutler et al. | |
| 7,074,373 B1* | 7/2006 | Warren ................ | B01J 8/0285 |
| | | | 423/655 |
| 7,592,291 B2 | 9/2009 | Rollins et al. | |
| 7,893,311 B2 | 2/2011 | Takamatsu et al. | |
| 11,161,101 B2 | 11/2021 | Kato et al. | |
| 11,547,987 B2 | 1/2023 | Masuda et al. | |
| 2003/0109383 A1 | 6/2003 | Koike et al. | |
| 2003/0188991 A1 | 10/2003 | Shan et al. | |
| 2004/0176245 A1 | 9/2004 | Hagemeyer et al. | |
| 2004/0192947 A1 | 9/2004 | Chane-ching et al. | |
| 2005/0201920 A1 | 9/2005 | Shan et al. | |
| 2006/0211777 A1* | 9/2006 | Severinsky ............... | C01B 3/16 |
| | | | 518/702 |
| 2006/0216227 A1 | 9/2006 | Idem et al. | |
| 2007/0004593 A1 | 1/2007 | Ohno et al. | |
| 2007/0167551 A1 | 7/2007 | Goodwin et al. | |
| 2008/0045400 A1 | 2/2008 | Rollins et al. | |
| 2008/0045403 A1 | 2/2008 | Rollins et al. | |
| 2008/0051280 A1 | 2/2008 | Hagemeyer et al. | |
| 2008/0072705 A1 | 3/2008 | Chaumonnot et al. | |
| 2008/0280754 A1 | 11/2008 | Toledo et al. | |
| 2008/0293990 A1 | 11/2008 | Stevenson et al. | |
| 2009/0286677 A1 | 11/2009 | Takeshima et al. | |
| 2009/0325790 A1 | 12/2009 | Haller et al. | |
| 2010/0004118 A1 | 1/2010 | Liu et al. | |
| 2011/0085944 A1 | 4/2011 | Rolllins et al. | |
| 2011/0092356 A1 | 4/2011 | Rollins et al. | |
| 2011/0092745 A1 | 4/2011 | Senoo et al. | |
| 2011/0121238 A1 | 5/2011 | Wakatsuki | |
| 2011/0293941 A1 | 12/2011 | Chaumonnot et al. | |
| 2012/0042631 A1 | 2/2012 | Schmieg et al. | |
| 2012/0060472 A1 | 3/2012 | Li et al. | |
| 2012/0130138 A1 | 5/2012 | Yamaguchi et al. | |
| 2012/0142238 A1 | 6/2012 | Saitou et al. | |
| 2012/0231948 A1 | 9/2012 | Saito | |
| 2013/0041174 A1 | 2/2013 | Yamamoto et al. | |
| 2013/0090445 A1 | 4/2013 | Hattori et al. | |
| 2014/0021096 A1 | 1/2014 | Chaumonnot et al. | |
| 2014/0128246 A1 | 5/2014 | Garcia-martinez | |
| 2014/0147362 A1 | 5/2014 | Sasaki et al. | |
| 2014/0284524 A1 | 9/2014 | Lee et al. | |
| 2014/0303266 A1* | 10/2014 | Hyman ................ | B01J 35/0006 |
| | | | 518/713 |
| 2015/0018590 A1 | 1/2015 | Stevenson et al. | |
| 2015/0290635 A1 | 10/2015 | Inokawa et al. | |
| 2015/0367332 A1 | 12/2015 | Kuvettu et al. | |
| 2016/0017238 A1 | 1/2016 | Stamires et al. | |
| 2016/0023913 A1 | 1/2016 | Goel et al. | |
| 2016/0024400 A1 | 1/2016 | Iwasa et al. | |
| 2016/0030934 A1 | 2/2016 | Zhan et al. | |
| 2016/0032202 A1 | 2/2016 | Yonemura et al. | |
| 2016/0087285 A1 | 3/2016 | Iwatanabe et al. | |
| 2016/0114314 A1 | 4/2016 | Ali et al. | |
| 2016/0137516 A1 | 5/2016 | Kegnæs et al. | |
| 2016/0369174 A1 | 12/2016 | Kool et al. | |
| 2017/0036197 A1 | 2/2017 | Kegnæs et al. | |
| 2018/0194700 A1 | 7/2018 | Pan et al. | |
| 2019/0039056 A1 | 2/2019 | Kato et al. | |
| 2020/0094229 A1 | 3/2020 | Masuda et al. | |
| 2020/0094232 A1 | 3/2020 | Masuda et al. | |
| 2020/0108374 A1 | 4/2020 | Masuda et al. | |
| 2020/0108378 A1 | 4/2020 | Masuda et al. | |
| 2020/0114335 A1 | 4/2020 | Masuda et al. | |
| 2020/0114336 A1 | 4/2020 | Masuda et al. | |
| 2020/0114337 A1 | 4/2020 | Masuda et al. | |
| 2020/0114339 A1 | 4/2020 | Masuda et al. | |
| 2020/0114341 A1 | 4/2020 | Masuda et al. | |
| 2020/0115248 A1 | 4/2020 | Masuda et al. | |
| 2020/0115640 A1 | 4/2020 | Masuda et al. | |
| 2020/0254432 A1 | 8/2020 | Shirman et al. | |
| 2023/0009052 A1 | 1/2023 | Masuda et al. | |

FOREIGN PATENT DOCUMENTS

| | | |
|---|---|---|
| CN | 1223602 A | 7/1999 |
| CN | 1720098 A | 1/2006 |
| CN | 1729138 A | 2/2006 |
| CN | 1876766 A | 12/2006 |
| CN | 101130466 A | 2/2008 |
| CN | 101180125 A | 5/2008 |
| CN | 101362959 A | 2/2009 |
| CN | 101720252 A | 6/2010 |
| CN | 101909750 A | 12/2010 |
| CN | 102056869 A | 5/2011 |
| CN | 102099114 A | 6/2011 |
| CN | 102247887 A | 11/2011 |
| CN | 102400744 A | 4/2012 |
| CN | 102574120 A | 7/2012 |
| CN | 102844115 A | 12/2012 |
| CN | 103459012 A | 12/2013 |

(56) References Cited

FOREIGN PATENT DOCUMENTS

| | | |
|---|---|---|
| CN | 103663490 A | 3/2014 |
| CN | 103889577 A | 6/2014 |
| CN | 104650291 A | 5/2015 |
| CN | 105008492 A | 10/2015 |
| CN | 105347359 A | 2/2016 |
| CN | 106362787 A | 2/2017 |
| EP | 0485180 A1 | 5/1992 |
| EP | 1709125 A1 | 10/2006 |
| EP | 2484444 A1 | 8/2012 |
| EP | 2692439 A1 | 2/2014 |
| EP | 2992984 A1 | 3/2016 |
| JP | S5746925 A | 3/1982 |
| JP | H0549943 A | 3/1993 |
| JP | H06-142456 A | 5/1994 |
| JP | H07-096195 A | 4/1995 |
| JP | H08155303 A | 6/1996 |
| JP | H1133412 A | 2/1999 |
| JP | H11151440 A | 6/1999 |
| JP | 2000197822 A | 7/2000 |
| JP | 2000511107 A | 8/2000 |
| JP | 2000323164 A | 11/2000 |
| JP | 2002255537 A | 9/2002 |
| JP | 2002336704 A | 11/2002 |
| JP | 2004528158 A | 9/2004 |
| JP | 2005170903 A | 6/2005 |
| JP | 2005189586 A | 7/2005 |
| JP | 2005270734 A | 10/2005 |
| JP | 2005314208 A | 11/2005 |
| JP | 2006021994 A | 1/2006 |
| JP | 2007130525 A | 5/2007 |
| JP | 2007519799 A | 7/2007 |
| JP | 2008012382 A | 1/2008 |
| JP | 2008542177 A | 11/2008 |
| JP | 2009505830 A | 2/2009 |
| JP | 2009255014 A | 11/2009 |
| JP | 2010501496 A | 1/2010 |
| JP | 2010099638 A | 5/2010 |
| JP | 2010527769 A | 8/2010 |
| JP | 2011517439 A | 6/2011 |
| JP | 4879574 B2 | 2/2012 |
| JP | 2012153654 A | 8/2012 |
| JP | 2012170951 A | 9/2012 |
| JP | 2012210557 A | 11/2012 |
| JP | 2013255911 A | 12/2013 |
| JP | 2014104428 A | 6/2014 |
| JP | 2014534902 A | 12/2014 |
| JP | 5700376 B2 | 4/2015 |
| JP | 2015165138 A | 9/2015 |
| JP | 2015189586 A | 11/2015 |
| JP | 2016002527 A | 1/2016 |
| JP | 2016064407 A | 4/2016 |
| JP | 2016069318 A | 5/2016 |
| JP | 2016087522 A | 5/2016 |
| JP | 2016529190 A | 9/2016 |
| JP | 2017039218 A | 2/2017 |
| JP | 2017064647 A | 4/2017 |
| JP | 2017509732 A | 4/2017 |
| JP | 2017128480 A | 7/2017 |
| WO | 9745197 A1 | 12/1997 |
| WO | 9745387 A1 | 12/1997 |
| WO | 2005083014 A1 | 9/2005 |
| WO | 2007000847 A1 | 1/2007 |
| WO | 2007023558 A1 | 3/2007 |
| WO | 2009096548 A1 | 8/2009 |
| WO | 2010097108 A1 | 9/2010 |
| WO | 2010097224 A2 | 9/2010 |
| WO | 2011065194 A1 | 6/2011 |
| WO | 2012105581 A1 | 8/2012 |
| WO | 2012170421 A1 | 12/2012 |
| WO | 2013057319 A2 | 4/2013 |
| WO | 2013115213 A1 | 8/2013 |
| WO | 2014083772 A1 | 6/2014 |
| WO | 2014132367 A1 | 9/2014 |
| WO | 2015001123 A1 | 1/2015 |
| WO | 2015155216 A1 | 10/2015 |
| WO | 2016014691 A1 | 1/2016 |
| WO | 2016181622 A1 | 11/2016 |
| WO | 2017000427 A1 | 1/2017 |
| WO | 2017072698 A1 | 5/2017 |

OTHER PUBLICATIONS

English machine translation of JP 2000-511107 A, entitled "Metal-containing zeolite catalyst, its preparation and use for the conversion of hydrocarbons".

English machine translation of JPH0796195 A, entitled "Exhaust Gas Purification Catalyst" dated Sep. 29, 1993.

https://sites.engineering.ucsb.edu/~jbraw/chemreacfun/ch7/slides-masswrxn-2up.pdf, College of Engineering, UC Santa Barbara accessed Apr. 26, 2021.

Dai, Chengyi et al., "Hollow zeolite-encapsulated Fe—Cu bimetallic catalysts for phenol degradation", Catalysis Today, Elsevier, Amsterdam, NL, vol. 297, Feb. 7, 2007 (Feb. 7, 2007), pp. 335-343, XP085215768, ISSN: 0920-5861, DOI: 10.1016/J.CATTOD.2017.02.001.

Li, Shiwen et al., "Diffusion Driven Selectivity in Oxidation of CO in Presence of Propylene Using Zeolite Nano Shell as Membrane", ACS Catalysis, vol. 4, No. 12, Dec. 2014, pp. 4299-4303.

Li, Shiwen et al., "Diffusion-Driven Selectivity in Oxidation of CO in the Presence of Propylene Using Zeolite Nano Shell as Membrane", ACS Catalysis, vol. 4, No. 12, Nov. 2014.

English Translation of CN 102247887(A).

Wang, D Y. et al., Study on methane aromatization over $MoO_3$/HMCM-49 catalyst, 2004, Catalysis Today, 93-95, Jul. 2, 2004, 75-80.

Cho, Hong J. et al., "Zeolite-Encapsualted Pt Nanoparticlles for Tandem Catalysis", J. Am. Chem. Soc., Sep. 24, 2018, 13514-13520.

Li, Peijun et al., "Ultrastable Perovskite-Zeolite Composite Enabled by Encapsulation and In Situ Passivation", Angewandte Chemie International Edition vol. 59, Issue 51, Sep. 5, 2020, 23300-23306.

Wang, Junwen et al., "In Situ Encapsulated Pt Nanoparticles Dispersed in Low Temperature Oxygen for Partial Oxidation of Methane to Syngas", Catalysts, Aug. 27, 2019, 720-734.

English machine translation of CN 106362787 A, entitled "Preparation method for zeolite-immobilized photocatalyst" dated Feb. 1, 2017.

English machine translation of JP 2002255537 A entitled "Solid Acid Catalyst" dated Sep. 11, 2002.

English machine translation of JP 2005314208 A entitled "Combined Porous Body and Its Manufacturing Method and Organic Substance Converting Method Using the Same" dated Nov. 10, 2005.

English machine translation of JP 2012170951 A entitled "Photocatalyst-Adsorbent Composite Powder" dated Sep. 10, 2012.

English machine translation of JP 2015165138 A entitled "Exhaust Gas Emission Control Device" dated Sep. 17, 2015.

English machine translation of JP 2016069318 A entitled "Storing Method for Secondary Alcohol and Loaded Body" dated May 9, 2016.

English machine translation of JP 2017128480 A entitled "Zeolite Including Metal Particle" dated Jul. 27, 2017.

English machine translation of JP H0549943A entitled "Oxidizing Catalyst" dated Mar. 2, 1993.

English machine translation of JPH1133412 entitled "A Production of Metal-Supporting Catalyst" dated Feb. 9, 1999.

English machine translation of WO 2007/023558 A1 entitled "Tungsten Oxide Photocatalyst, Process for Producing the Same, and Fiber Cloth Having Deodorizing/Antifouling Function" dated Mar. 1, 2007.

English machine translation of WO 2009/096548 A1 entitled "Silver-(Titanium Oxide)-Zeolite Adsorbent/Decomposing Material and Process for Production Thereof" dated Aug. 6, 2009.

English machine translation of WO 2012/105581 A1 entitled "Method for Producing Oxide Semiconductor Layer" dated Sep. 8, 2012.

Extended European Search Report for EP Application No. 18809577.2, dated Dec. 7, 2020.

(56) References Cited

OTHER PUBLICATIONS

Dai, Chengyi et al., "Hollow Zeolite Encapsulated Ni—Pt Bimetals for Sintering and Coking Resistant Dry Reforming of Methane", Journal of Materials Chemistry A, vol. 3, No. 32, Jun. 29, 2015, pp. 16461-16468.

Liu, Xue et al., "Drying Of Ni/Alumina Catalysts: Control of the Metal Distribution Using Surfacants and the Melt Infiltration Methods", Industrial & Engineering Chemistry Research, vol. 53, No. 14, Apr. 9, 2014, pp. 5792-5800.

Makshina, Ekaterina et al., "Methanol Oxidation on LaCo Mixed Oxide Supported Onto MCM-41 Molecular Sieve", Catalysis Today, vol. 131, No. 1, Nov. 2007, pp. 427-430.

Maneesha, Mishra et al., "[alpha]-Fe2O3 as a photocatalytic material: A review", Applied Catalysis A: General, Elsevier, Amsterdam, NL, vol. 498, Mar. 28, 2015 (Mar. 28, 2015), pp. 126-141, XP029220089, ISSN: 0926-860X, DOI: 10.1016/J.APCATA.2015.03.023.

Wang, Hong et al., "Research into eliminating particulate from diesel engine exhaust over zeolite covered with catalysts of perovskite-type oxides", 2009 International Conference on Energy and Environment Technology : ICEET 2009 ; Guilin, China, Oct. 16-18, 2009, IEEE, Piscataway, NJ, USA, Oct. 16, 2009 (Oct. 16, 2009), pp. 493-495, XP031588294, ISBN: 978-0-7695-3819-8.

Yokoi, Toshiyuki , "Characterization of Zeolites By Advanced SEM/STEM Techniques", The Hitachi Scientific Instrument News, vol. 7, Sep. 2016, pp. 17-23.

Yue, Ming B. et al., "Directly Transforming As-Synthesized MCM-41 to Mesoporous MFI Zeolite", Journal of Material Chemistry, vol. 18, No. 17, Mar. 13, 2008, p. 2044.

Zhijie, Wu et al., Hydrothermal synthesis of L TA-encapsulated metal clusters and consequences for catalyst stability, reactivity, and selectivity, Journal of Catalysis, Academic Press, Duluth, MN, US, vol. 311, Jan. 31, 2014 (Jan. 31, 2014), pp. 458-468, XP028612174, ISSN: 0021-9517, DOI: 10.1016/J.JCAT.2013.12.021.

Newsam, J.M. , "The Zeolite Cage Structure", Science, Mar. 7, 1986, New Series, vol. 231, No. 2742, pp. 1093-1099 (Year: 1986).

[English Translation] First Office Action dated May 16, 2022 for Chinese Patent Application No. 201880036071.3; pp. all.

[English Translation] First Office Action dated May 5, 2022 for Chinese Patent Application No. 201880036312.4; pp. all.

[English Translation] First Office Action dated May 7, 2022 for Chinese Patent Application No. 201880035210.0; pp. all.

[English Translation] Notice of Reasons for Refusal dated Jun. 6, 2022 for Japanese Patent Application No. 2019-521326; pp. all.

First Office Action dated May 6, 2022 for Australian Patent Application No. 2021202968; pp. all.

Dai, Chengyi, et al., "Hollow Zeolite encapsulated Ni—Pt bimetals for sintering and coking resistant dry reforming of methane", Journal of Materials Chemistry A, Jan. 1, 2015, 9 pages.

[Partial English Translation] Zhang, Yicheng , et al., "Advances in the catalysis of methanol to aromatics reaction", Chemical Industry and Engineering Progress, vol. 35 No. 3, Mar. 5, 2016, pp. 801-806.

[English Abstract] Zhang, Lian-Zhong , et al., "Preparation of Phenol and Acetone with Solid Acid Catalyst", [With Chemical World, Mar. 16, 2012, pp. 487-490.

Do, Trong-On et al., "Zeolite Nanoclusters Coated onto the Mesopore Walls of SBA-15", J. Am. Chem. SOC. vol. 126, No. 44, 2004, pp. 14324-14325.

[English Translation] Notice of Reasons for Refusal dated Mar. 16, 2022 for Japanese Patent Application No. 2019-521322.

[English Translation] Notice of Reasons for Refusal dated Mar. 28, 2022 for Japanese Patent Application No. 2019-521324.

[English Translation] First Office Action dated Apr. 20, 2022 for Chinese Patent Application No. 201880035803.7; pp. all.

[English Translation] Li, Jinlin , et al., "SBA-16 with Different Pore Size Supported Cobal Catalyst for Fischer-Tropsch Synthesis", Journal of South-Central University for Nationalities (National Science Edition); vol. 34 No. 4, Key Laboratory of Catalysis and Materials Science of the State, Ethnic Affairs Commission & Ministry of Education, Dec. 2015; pp. all.

[English Translation] Liu, Quansheng , et al., "Progress in Water-Gas-Shift Catalysts", Progress in Chemistry; vol. 17 No. 3; Institute of Chemical Engineering, Inner Mongolia University of Technology, Hohhot 010062, China, May 2005; pp. all.

[English Translation] Notice of Reasons for Refusal dated Mar. 16, 2022 for Japanese Patent Application No. 2019-521331.

[English Translation] Notice of Reasons for Refusal dated Feb. 7, 2022 for Japanese Patent Application No. 2019-521334.

[English Translation] Notice of Reasons for Refusal dated Feb. 7, 2022 for Japanese Patent Application No. 2019-521335.

[English Translation] Notice of Reasons for Refusal dated Feb. 7, 2022 for Japanese Patent Application No. JP2019-521325.

[English Translation] Saudi Arabian Office Action dated Jan. 27, 2022 for Saudi Arabian Patent Application No. 519410663.

Cai et al. "Gold Nanoclusters Confined in a Supercage of Y Zeolite for Aerobic Oxidation of HMF under Mild Conditions", Chem. Rur. J, 2013, 19, pp. 14215-14223.

Corma et al. "A zeolite with interconnected 8-, 10-, and 12-ring pores and its unique catalytic selectivity", Nature Materials, vol. 2, Jun. 22, 2003, pp. 493-499.

Corma et al. "ITQ-15: The First ultralarge pore zeolite with a bi-directional pore system formed by intersecting 14- and 12-ring channels, and its catalytic implications", Chem. Commun., May 18, 2004, pp. 1356-1357.

Kalogeras et al. "Electrical Properties of Zeolitic Catalysts", Defect and Diffusion Forum vol. 164, Sep. 1998, pp. 1-36.

Mitra et al. "Molecular dynamics using quasielastic neutron scattering", Current Science, vol. 84, No. 5, Mar. 2003; pp. 653-662.

Nan Jiang et al. "The Adsorption Mechanisms of Organic Micropollutants on High-Silica Zeolites Causing S-Shaped Adsorption Isotherms: An Experimental and Monte Carlo Simulations Study", Chemical Engineering Journal; Nov. 2019; pp. all.

English translation of International Preliminary Report on Patentability for Application No. PCT/JP2018/021086, dated Dec. 3, 2019.

English translation of Written Opinion for Application No. PCT/JP2018/021086, dated Aug. 21, 2018.

International Search Report (EN translation of ISR only) and Written Opinion for Application No. PCT/JP2018/021086, dated Aug. 21, 2018.

Fujikawa, Takashi , "Current Status and Future Prospects of Petroleum Refining Catalysts", The Nikkan Kogyo Shimbun, Ltd., vol. 65, No. 1, Jan. 1, 2017, p. 22.

Fumoto, Eri et al., "Catalytic Cracking of Heavy Oil With Iron Oxide-Based Catalysts Using Hydrogen and Oxygen Species From Steam", Journal of the Japan Petroleum Institute, vol. 58, No. 5, Feb. 25, 2015, 329-335.

Haruta, Masatake , "Low-Temperature Combustion Catalysts Mainly for CO Oxidation", Journal of The Japan Petroleum Institute, vol. 37, No. 5, Sep. 1, 1994, pp. 480-491.

Ichikawa, Masaru et al., "Advanced Technology of Methane Chemical Conversion", CMC Publishing Co., Ltd., Jan. 2008.

Ismagilov, Z.R. et al., "Structural Changes of MO/ZSM-5 Catalysts During the Ethane Dehydroaromatization", Eurasian Chemico-Technological Journal, Journal 12, Nov. 2009, 9-16.

Laprune, David et al., "Highly Dispersed Nickel Particles Encapsulated in Multi-Hollow Silicalite-1 Single Crystal Nanoboxes: Effects of Siliceous Deposits and Phosphorous Species on the Catalytic Performances", ChemCatChem, vol. 9, Issue 12, dated Feb. 18, 2017, pp. 2297-2307.

Muroi, Takajyo , "Development Trends of Methane Chemistry Catalysts", Catalyst Round-table Conference News, No. 96, Nov. 1, 2016.

Muroi, Takashiro , "Reverse Water Gas Shift Catalysts", Industrial Catalyst News, No. 107, Aug. 1, 2017, 2 pages.

Sasaki, Makoto et al., "Templating Fabrication of Platinum Nanoparticles and Nanowires Using the Confined Mesoporous Channels of FSM-16—Their Structural Characterization and Catalytic Performances in Water Gas Shift Reaction", Journal of Molecular Catalysis A: Chemical, vol. 141, No. 1/3, May 6, 1999, p. 223-240.

(56) References Cited

OTHER PUBLICATIONS

Wu, Zhijie et al., "Hydrothermal Synthesis of LTA-Encapsulated Metal Clusters and Consequences for Catalyst Stability, Reactivity, and Selectivity", Journal of Catalysis, vol. 311, dated Jan. 31, 2014, pp. 458-468.
[English Translation] Notice of Reasons for Refusal for Japanese Patent Application No. 2019-521326 dated Nov. 25, 2022, pp. all.
[English Translation] Second Office Action for Chinese Patent Application No. 201880035803.7 dated Nov. 10, 2022, pp. all.
[English Translation] Second Office Action for Chinese Patent Application No. 201880036312.4 dated Nov. 10, 2022, pp. all.
Zhong, Bangke , "Catalysis i Fine chemical process", Sinopec Press; ISBN 7-80164-251-1, Aug. 2002, 4 pages.
[English Translation] First Office Action dated Jul. 11, 2022 for Chinese Patent Application No. 201880036382.X.
[English Translation] First Office Action dated Jul. 13, 2022 for Chinese Patent Application No. 201880035026.6.
[English Translation] First Office Action dated Jul. 5, 2022 for Chinese Patent Application No. 201880035017.7.
[English Translation] First Office Action dated Jun. 29, 2022 for Chinese Patent Application No. 201880036388.7.
[English Translation] First Office Action dated Jun. 27, 2022 for Chinese Patent Application No. 201880035525.5.
[English Translation] Notice of Reasons for Refusal dated Aug. 3, 2022 for Japanese Patent Application No. 2019-521322.
[English Translation] Notice of Reasons for Refusal dated Aug. 3, 2022 for Japanese Patent Application No. 2019-521331.
[English Translation] The First Office Action dated Jul. 20, 2022 for Chinese Patent Application No. 201880035173.3.
[English Translation] The First Office Action dated Jul. 20, 2022 for Chinese Patent Application No. 201880035360.1.
Dai, Chengyi, et al., "Synthesis of Hollow Nanocubes and Macroporous Monoliths of Silicalite-1 by Alkaline Treatment", Chemistry of Materials, Oct. 7, 2013, pp. 4197-4205.
Hosseinpour, Negahdar , et al., "Cumene cracking activity and enhanced regeneration of FCC catalystscomprising HY-zeolite and LaBO3(B=Co, Mn, and Fe) perovskites", Applied Catalysis A, vol. 487,, Oct. 2014, pp. 26-35.
Laprune, David , et al., "Highly Disperesed Nickel Particles Encapsulated in Multihollow Silicalite-1 Single Crystal Nanoboxes: Effects of Siliceous Deposits and Phosphorous Species on the Catalytic Performances", ChemCatChem, Sep. 2017, pp. 2297-2307.
Liang, Wenping , et al., "Surfactant Applications in Dispersion Systems", China Light Industry Press, Feb. 2003.
Miao, Tao , et al., "Highly dispersed nickel within mesochannels of SBA-15 for CO methanation with enhanced activity and excellent thermostability", Fuel, Journal vol. 188, No. 12; homepage: www.elsevier.com/locate/fuel, 2017, pp. 267-276.
Roque-Malherbe, Rolando M.A., "Adsorption and Diffusion in Nanoporous Materials", Materials Chemistry, Mar. 5, 2007.
[English Translation] First Office Action dated Aug. 3, 2022 for Chinese Patent Application No. 201880035569.8; pp. all.
[English Translation] First Office Action dated Aug. 3, 2022 for Chinese Patent Application No. 201880036313.9; pp. all.
[English Translation] Notice of Reasons for Refusal dated Aug. 16, 2022 for Japanese Patent Application No. 2019-521324; pp. all.
[English Translation] "Preparation and Application of Molecular Sieves", Edited by Shanghai Reagent Factory, Jun. 1976; pp. all.
[English Translation] Notice of Reasons for Refusal for Japanese Patent Application No. 2019-521325 dated Sep. 27, 2022, pp. all.
[English Translation] Notice of Reasons for Refusal for Japanese Patent Application No. 2019-521334, dated Sep. 27, 2022, pp. all.
[English Translation] Notice of Reasons for Refusal for Japanese Patent Application No. 2019-521335, dated Sep. 27, 2022, pp. all.
[English Translation] Notice of Reasons for Refusal dated Jun. 28, 2022 for Japanese Patent Application No. 2019-521318; pp all.
[English Translation] Notice of Reasons for Refusal dated Jun. 28, 2022 for Japanese Patent Application No. 2019-521319; pp all.
[English Translation] Notice of Reasons for Refusal dated Jun. 28, 2022 for Japanese Patent Application No. 2019-521320; pp. all.
[English Translation] Notice of Reasons for Refusal dated Jun. 28, 2022 for Japanese Patent Application No. 2019-521321; pp. all.
[English Translation] Second Office Action dated Dec. 23, 2022 in CN Application No. 201880035210.0; pp. all.
[English Translation] Second Office Action dated Jan. 5, 2023 in CN Application No. 201880035525.5; pp. all.
[English Translation] Notice of Reasons for Refusal dated Sep. 27, 2022 for Japanese Patent Application No. 2019-521325; pp. all.
[English Translation] Notice of Reasons for Refusal dated Sep. 27, 2022 for Japanese Patent Application No. 2019-521334, pp. all.
[English Translation] Notice of Reasons for Refusal dated Sep. 27, 2022 for Japanese Patent Application No. 2019-521335, pp. all.
Office Action dated Dec. 18, 2022 for SA Application No. 519410677; pp. all.
Office Action dated Dec. 18, 2023 for SA Application No. 519410673; pp. all.
Office Action dated Dec. 26, 2022 for SA Application No. 519410680; pp. all.
Second Office Action dated Jan. 20, 2023 for CN Application No. 201880035360.1; pp. all.
Second Office Action dated Jan. 12, 2023 for CN Application No. 201880036382.X; pp. all.
Second Office Action dated Jan. 19, 2023 for CN Application No. 201880035017.7; pp. all.
Second Office Action dated Jan. 20, 2023 for CN Application No. 201880035026.6, pp. all.
Second Office Action dated Jan. 18, 2023 in CN Application No. 201880036313.9; pp. all.
Decision of Refusal for Japanese Patent Application No. 2019-521318, dated Feb. 1, 2023, pp. all.
Decision of Refusal for Japanese Patent Application No. 2019-521319, dated Feb. 1, 2023, pp. all.
Notice of Reasons for Refusal for Japanese Patent Application No. 2019-521320, dated Feb. 1, 2023, pp. all.
Notice of Reasons for Refusal for Japanese Patent Application No. 2019-521321, dated Feb. 1, 2023, pp. all.
[English Translation] Second Office Action dated Feb. 18, 2023 in CN Application No. 201880035173.3 pp. all.
[English Translation] Second Office Action dated Feb. 24, 2023 in CN Application No. 201880035569.8 pp. all.
[English Translation] Third Office Action dated Mar. 8, 2023 for CN Application No. 201880035803.7; pp. all.
[English Translation] Third Office Action mailed Mar. 8, 2023 in CN Application No. 201880036312.4; pp. all.
[English Translation] Notice of Reasons for Refusal for Japanese Patent Application No. 2019-521322 dated Apr. 4, 2023, pp. all.
[English Translation] Notice of Reasons for Refusal for Japanese Patent Application No. 2019-521325 dated Apr. 4, 2023, pp. all.
[English Translation] Notice of Reasons for Refusal for Japanese Patent Application No. 2019-521331 dated Apr. 4, 2023, pp. all.
[English Translation] Notice of Reasons for Refusal for Japanese Patent Application No. JP-2019-521335 dated Apr. 4, 2023, pp. all.
[English Translation] Notice of Reasons for Refusal dated Mar. 22, 2023 in JP Application No. 2019-521324 pp. all.

* cited by examiner

STRUCTURED CATALYST FOR CO SHIFT OR REVERSE SHIFT AND METHOD FOR PRODUCING SAME, CO SHIFT OR REVERSE SHIFT REACTOR, METHOD FOR PRODUCING CARBON DIOXIDE AND HYDROGEN, AND METHOD FOR PRODUCING CARBON MONOXIDE AND WATER

CROSS REFERENCE TO RELATED APPLICATIONS

The present application is a continuation application of International Patent Application No. PCT/JP2018/021086 filed on May 31, 2018, which claims priority to Japanese Patent Application No. 2017-108630, filed on May 31, 2017. The contents of these applications are incorporated herein by reference in their entirety.

TECHNICAL FIELD

The present disclosure relates to a structured catalyst for CO shift or reverse shift including a support of a porous structure and a CO shift or reverse shift catalyst, a method for producing the same, a CO shift or reverse shift reactor, a method for producing carbon dioxide and hydrogen, and a method for producing carbon monoxide and water.

BACKGROUND ART

In recent years, in order to suppress global warming, further reduction of $CO_2$ emissions is demanded in thermal power plants and the like, and, for example, coal gasification combined power generation that can further reduce $CO_2$ emission through efficient power generation is performed. In the coal gasification combined power generation, coal is converted to a flammable gas in a gasifier at high temperature and high pressure, the converted generated gas is used as a fuel for power generation, and the waste water released at the time of conversion to the flammable gas is used for power generation in a steam turbine.

Also, the compound present in the generated gas is mostly carbon monoxide (CO), and contains few percentages of carbon dioxide ($CO_2$) and hydrocarbon ($C_nH_m$). Accordingly, in order to recover $CO_2$ from the generated gas, CO present in the generated gas must be converted to $CO_2$. In conversion of $CO_2$, the generated gas is mixed with water vapor ($H_2O$), and converted to $CO_2$ using a CO shift catalyst by the CO shift reaction represented by Formula (1), and the converted $CO_2$ is recovered with a $CO_2$ recovery equipment.

$$CO + H_2O \rightarrow CO_2 + H_2 \tag{1}$$

Examples of the CO shift catalyst include a Cu—Zn catalyst having CO shift reaction activity in a low-temperature region at 300° C. or lower, and a Fe—Cr catalyst having CO shift reaction activity in a high-temperature region at 300° C. or higher. Furthermore, CO shift catalysts having activity in a high-temperature region can cause problem of carbon deposition, and thus requires excessive addition of water vapor to CO. On the other hand, excessive addition of water vapor can lead to the decrease in power generation efficiency, so that the reduction of the added amount of water vapor is required while the amount is excessive relative to CO.

Therefore, WO 2014/132367 proposes a CO shift catalyst that includes either molybdenum (Mo) or iron (Fe) as a main component, an active component including either nickel (Ni) or ruthenium (Ru) as a minor component, and a complex oxide composed any two or more of titanium (Ti), zirconium (Zr), cerium (Ce), silica (Si), aluminum (Al), and lanthanum (La) as a support supporting the active component, the CO shift catalyst having been sintered at a high temperature of 550° C. or higher to increase the average pore diameter of the catalyst, and having excellent durability and maintaining stable CO shift reaction for a long period of time even in cases where carbon deposition occurs.

In addition, the generated gas may include $H_2S$ and may be poisoned with a sulfur component depending on the catalyst species, so that desulfurization operation is required in the previous stage. Therefore, as a catalyst having CO shift reaction activity even in the presence of $H_2S$, JP 2014-104428 A proposes a catalyst including at least Mo and Ni, and $TiO_2$ as a support supporting these active components.

However, the generated gas is mostly CO and the CO shift reaction is exothermic, so that the CO shift reaction increases the temperature of the CO shift catalyst. Thus, when the CO shift catalyst particles are exposed to high temperatures for a long period of time, aggregation (sintering) of the CO shift catalyst particles and the support components tends to occur. In a case where aggregation of the catalyst particles occurs, catalytic activity decreases due to the decrease in the effective surface area of the catalyst, and the catalyst life becomes shorter than normal. Therefore, the catalyst itself must be replaced or regenerated over a short period of time, which leads to the problem that the replacement operation is cumbersome and resources saving cannot be achieved.

In recent years, since carbon dioxide is a main cause of global warming, reduction and effective use of its emission have been urgent issues. Furthermore, hydrocarbon gases are generated in technical fields such as petroleum refining and petrochemical, and efficient conversion of these gases to more effective substances has been demanded.

Under such circumstances, proposed is a method including performing reverse shift reaction using hydrogen and carbon dioxide, and producing a synthetic gas from the generated carbon monoxide and the unreacted portion of hydrogen. Many of the catalysts that promote the shift reaction are considered to have activity as a catalyst for the reverse shift reaction represented by Formula (2) below.

$$CO_2 + H_2 \rightarrow CO + H_2O \tag{2}$$

In consideration of the composition (equilibrium composition) of the synthetic gas generated by the reverse shift reaction, the reaction is preferably performed at a high temperature of 600° C. or higher. However, since the temperature of 600° C. or higher is usually much higher than the normal temperature of the shift reaction, the use of a catalyst for a normal shift reaction is difficult from the perspective of calcination resistance of the catalytic metal (WO 2011/065194).

In recent years, as catalysts for reverse shift reaction, the use of Ni catalysts such as $Ni/Al_2O_3$ and NiO/ZnO has been reported (Industrial Catalyst News No. 107, Aug. 1, 2017). However, Ni catalysts have a problem that they can cause methanation to generate methane, and decrease the carbon monoxide concentration. Therefore, there is a desire to develop a catalyst for reverse shift reaction that can minimize generation of methane.

SUMMARY OF DISCLOSURE

Technical Problem

An object of the present disclosure is to provide a structured catalyst for CO shift or reverse shift for realizing a long life time by suppressing the decline in function, a method for producing the same, a CO shift or reverse shift reactor, a method for producing carbon dioxide and hydrogen, and a method for producing carbon monoxide and water.

Solution to Problem

As a result of diligent research to achieve the object described above, the present inventors have found that the structured catalyst for CO shift or reverse shift that suppresses the decline in catalytic activity of the CO shift or reverse shift catalytic substance and realizes a long life time can be obtained by including:

a support of a porous structure composed of a zeolite-type compound; and at least one CO shift or reverse shift catalytic substance present in the support, in which the support has channels connecting with each other, and the CO shift or reverse shift catalytic substance is present at least in the channels of the support, and thus completed the present disclosure based on such finding.

In other words, the summary configurations of the present disclosure are as follows.

[1] A structured catalyst for CO shift or reverse shift, including:

a support of a porous structure composed of a zeolite-type compound; and at least one CO shift or reverse shift catalytic substance present in the support, in which the support has channels connecting with each other, and the CO shift or reverse shift catalytic substance is present at least in the channels of the support.

[2] The structured catalyst for CO shift or reverse shift according to [1], in which the channels have any one of a one-dimensional pore, a two-dimensional pore, and a three-dimensional pore defined by a framework of the zeolite-type compound and an enlarged pore portion different from any of the one-dimensional pore, the two-dimensional pore, and the three-dimensional pore, and the CO shift or reverse shift catalytic substance is present at least in the enlarged pore portion.

[3] The structured catalyst for CO shift or reverse shift according to [2], in which the enlarged pore portion causes a plurality of pores constituting any one of the one-dimensional pore, the two-dimensional pore, and the three-dimensional pore to connect with each other.

[4] The structured catalyst for CO shift or reverse shift according to [2], in which the CO shift or reverse shift catalytic substance is made of metal nanoparticles.

[5] The structured catalyst for CO shift or reverse shift according to [4], in which the metal nanoparticles are nanoparticles composed of at least one type of metal or metal oxide selected from the group consisting of cobalt, nickel, iron, and copper.

[6] The structured catalyst for CO shift or reverse shift according to [5], in which the metal nanoparticles are nanoparticles composed of at least one type of metal or metal oxide selected from the group consisting of cobalt, iron, and copper.

[7] The structured catalyst for CO shift or reverse shift according to [4], in which the average particle size of the metal nanoparticles is greater than an average inner diameter of the channels and is less than or equal to the inner diameter of the enlarged pore portion.

[8] The structured catalyst for CO shift or reverse shift according to [4], in which a metal element (M) of the metal nanoparticles is contained in an amount from 0.5 mass % to 2.5 mass % based on the structured catalyst for CO shift or reverse shift.

[9] The structured catalyst for CO shift or reverse shift according to [4], in which the average particle size of the metal nanoparticles is from 0.08 nm to 30 nm.

[10] The structured catalyst for CO shift or reverse shift according to [9], in which the average particle size of the metal nanoparticles is from 0.4 nm to 11.0 nm.

[11] The structured catalyst for CO shift or reverse shift according to [4], in which the ratio of the average particle size of the metal nanoparticles to the average inner diameter of the channels is from 0.05 to 300.

[12] The structured catalyst for CO shift or reverse shift according to [11], in which the ratio of the average particle size of the metal nanoparticles to the average inner diameter of the channels is from 0.1 to 30.

[13] The structured catalyst for CO shift or reverse shift according to [12], in which the ratio of the average particle size of the metal nanoparticles to the average inner diameter of the channels is from 1.4 to 3.6.

[14] The structured catalyst for CO shift or reverse shift according to [2], in which the average inner diameter of the channels is from 0.1 nm to 1.5 nm, and the inner diameter of the enlarged pore portion is from 0.5 nm to 50 nm.

[15] The structured catalyst for CO shift or reverse shift according to [1], further including at least one another CO shift or reverse shift catalytic substance held on an outer surface of the support.

[16] The structured catalyst for CO shift or reverse shift according to [15], wherein the content of the at least one CO shift or reverse shift catalytic substance present in the support is greater than that of the at least one other CO shift or reverse shift catalytic substance held on an outer surface of the support.

[17] The structured catalyst for CO shift or reverse shift according to [1], in which the zeolite-type compound is a silicate compound.

[18] A CO shift or reverse shift reactor having the structured catalyst for CO shift or reverse shift described in [1].

[19] A method for producing a structured catalyst for CO shift or reverse shift, including:

a calcination step of calcining a precursor material (B) obtained by impregnating a precursor material (A) for obtaining a support of a porous structure composed of zeolite-type compound with a metal-containing solution;

a hydrothermal treatment step of hydrothermal-treating a precursor (C) obtained by calcining the precursor material (B); and a reduction treatment step of the hydrothermally treated precursor material (C).

[20] The method for producing the structured catalyst for CO shift or reverse shift according to [19], in which from 50 to 500 mass % of a non-ionic surfactant is added to the precursor material (A) before the calcination step.

[21] The method for producing the structured catalyst for CO shift or reverse shift according to [19], in which the precursor material (A) is impregnated with the metal-containing solution by adding the metal-containing solution to the precursor material (A) in multiple portions prior to the calcination step.

[22] The method for producing the structured catalyst for CO shift or reverse shift according to [19], in which in impregnating the precursor material (A) with the metal-containing solution prior to the calcination step, the value obtained by converting the added amount of the metal-containing solution added to the precursor material (A) to the ratio of silicon (Si) constituting the precursor material (A) to the metal element (M) included in the metal-containing solution added to the precursor material (A) (a ratio of number of atoms Si/M) is adjusted to from 10 to 1000.

[23] The method for producing the structured catalyst for CO shift or reverse shift described in [19], in which in the hydrothermal treatment step, the precursor material (C) and a structure directing agent are mixed.

[24] The method for producing the structured catalyst for CO shift or reverse shift described in [19], in which the hydrothermal treatment step is performed in a basic condition.

[25] A method for producing carbon dioxide and hydrogen that generates carbon dioxide and hydrogen from carbon monoxide and water using a catalyst, the catalyst including:
a support of a porous structure composed of a zeolite-type compound; and
at least one type of metal nanoparticles present in the support,
in which the support has channels connecting with each other, and
the metal nanoparticles include a structured catalyst for CO shift present in at least an enlarged pore portion of the channels.

[26] A method for producing carbon dioxide and hydrogen, in which carbon dioxide and hydrogen are generated from carbon monoxide and water using the structured catalyst for CO shift described in [1].

[27] A method for producing carbon dioxide and hydrogen, in which carbon monoxide and water are converted to carbon dioxide and hydrogen using the CO shift reactor described in [18].

[28] A method of producing carbon monoxide and water that generates carbon monoxide and water from carbon dioxide and hydrogen using a catalyst, the catalyst including:
a support of a porous structure composed of a zeolite-type compound; and
at least one type of metal nanoparticles present in the support,
in which the support has channels connecting with each other, and
the metal nanoparticles include a reverse shift structured catalyst present in at least an enlarged pore portion of the channels.

[29] A method for producing carbon monoxide and water, in which carbon monoxide and water are generated from carbon dioxide and hydrogen using the structured catalyst for reverse shift described in [I].

[30] A method for producing carbon monoxide and water, in which carbon dioxide and hydrogen are converted to carbon monoxide and water using the reverse shift reactor described in [18].

Advantageous Effects of Disclosure

According to the present disclosure, provided are a structured catalyst for CO shift or reverse shift that can realize a long life time by suppressing the decline in function, a method for producing the same, a CO shift or reverse shift reactor, a method for producing carbon dioxide and hydrogen, and a method for producing carbon monoxide and water. In addition, the structured catalyst for CO shift and the structured catalyst for reverse shift exhibit high catalytic activity and good heat resistance, so that particularly the structured catalyst for reverse shift is beneficial for use in reverse shift reactions.

BRIEF DESCRIPTION OF DRAWINGS

FIG. 1A is a perspective view (partially illustrated in cross section), and FIG. 1B is a partially enlarged cross-sectional view.

FIG. 2A is a diagram illustrating the function of a sieve, and FIG. 2B is a diagram explaining the catalytic capacity.

DESCRIPTION OF EMBODIMENTS

Figure 1A:
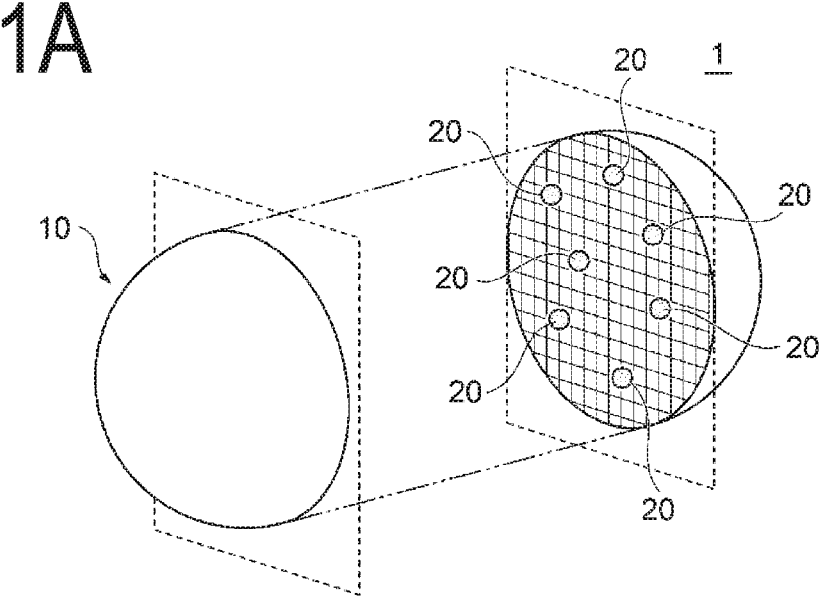
FIGS. 1A and 1B are diagrams schematically illustrating a structured catalyst for CO shift or reverse shift according to an embodiment of the present disclosure so that its inner structure can be understood.
Figure 1B:
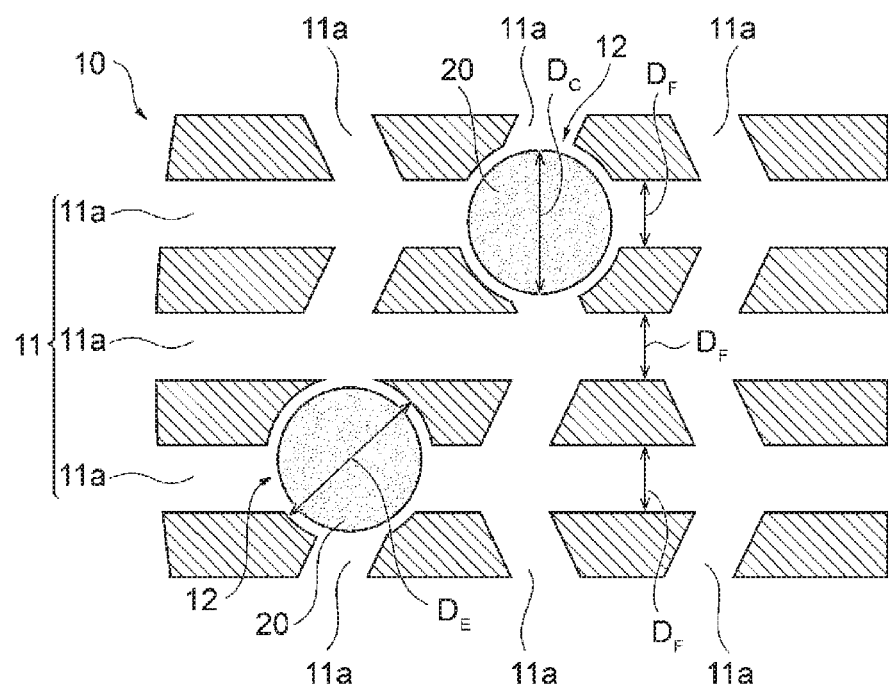

Hereinafter, embodiments of the present disclosure will be described in detail with reference to drawings.
Configuration of CO Shift or Structured Catalyst for Reverse Shift FIGS. 1A and 1B are diagrams schematically illustrating a configuration of a structured catalyst for CO shift or reverse shift according to an embodiment of the present disclosure. In FIG. 1A is a perspective view (partially illustrated in cross section), and FIG. 1B is a partially enlarged cross-sectional view. Note that the structured catalyst for CO shift or reverse shift in FIGS. 1A and 1B are examples of the structured catalyst for CO shift or reverse shift, and the shape, dimension, and the like of each of the configurations according to the present disclosure are not limited to those illustrated in FIGS. 1A and 1B.

As shown in FIG. 1A, a structured catalyst for CO shift or reverse shift 1 includes a support 10 of a porous structure composed of a zeolite-type compound, and at least one CO shift or reverse shift catalytic substance 20 present in the support 10.

In the structured catalyst for CO shift or reverse shift 1, a plurality of CO shift or reverse shift catalytic substances 20, 20, . . . are embedded in the porous structure of the support 10. The CO shift or reverse shift catalytic substance 20 may be any substance having CO shift catalytic capacity (CO shift or reverse shift catalytic activity), and is preferably made of metal nanoparticles. The metal nanoparticles are described in detail below.

The support 10 is a porous structure, and as illustrated in FIG. 1B, a plurality of pores 11a, 11a, . . . are preferably formed so as to have channels 11 connecting with each other. Here, the CO shift or reverse shift catalytic substance 20 is present at least in the channel 11 of the support 10, and is preferably held at least in the channel 11 of the support 10.

With such a configuration, movement of the CO shift or reverse shift catalytic substance 20 within the support 10 is restricted, and aggregation between the CO shift or reverse shift catalytic substances 20 and 20 is effectively prevented. As a result, the decrease in effective surface area of the CO shift or reverse shift catalytic substance 20 can be effectively suppressed, and the CO shift or reverse shift catalytic activity of the CO shift or reverse shift catalytic substance 20 lasts for a long period of time. In other words, the structured catalyst for CO shift or reverse shift 1 suppresses the decline in the CO shift or reverse shift catalytic activity due to aggregation between the CO shift or reverse shift catalytic substances 20, and extends the life of the structured catalyst for CO shift or reverse shift 1. In addition, due to the long life time of the structured catalyst for CO shift or reverse shift 1, the replacement frequency of the structured catalyst for CO shift or reverse shift 1 can be reduced, and the amount of waste of the used structured catalyst for CO shift or reverse shift 1 can be significantly reduced, and thereby can save resources.

Typically, when the structured catalyst for CO shift or reverse shift is used, for example, in a fluid that is a CO-containing gas produced by converting coal to a flammable gas, the structural body can be subjected to an external force from the fluid. In this case, if the CO shift or reverse shift catalytic substance is only held in the state of attachment to the outer surface of the support 10, there is a problem in that it is easily detached from the outer surface of the support 10 due to the influence of the external force from the fluid. In contrast, in the structured catalyst for CO shift or reverse shift 1, the CO shift or reverse shift catalytic substance 20 is present at least in the channel 11 of the support 10, and therefore, even if subjected to an external force caused by a fluid, the CO shift or reverse shift catalytic substance 20 is less likely detached from the support 10. That is, when the structured catalyst for CO shift or reverse shift 1 is in a fluid, the fluid flows into the channel 11 from the pore 11a of the support 10, so that the speed of the fluid flowing through the channel 11 is likely slower than the speed of the fluid flowing on the outer surface of the support 10 due to the flow path resistance (frictional force). Due to the influence of such flow path resistance, the pressure applied to the CO shift or reverse shift catalytic substance 20 present in the channel 11 from the fluid is lower than the pressure applied to the CO shift or reverse shift catalytic substance 20 from the fluid outside of the support 10. As a result, detachment of the CO shift or reverse shift catalytic substance 20 present in the support 10 can be effectively suppressed, and the catalytic activity of the CO shift or reverse shift catalytic substance 20 can be stably maintained over a long period of time. Note that the flow path resistance as described above is thought to be larger so that the channel 11 of the support 10 has a plurality of bends and branches, and the interior of the support 10 becomes a more complex three-dimensional structure.

Preferably, the channel 11 has any one of a one-dimensional pore, a two-dimensional pore, and a three-dimensional pore defined by the framework of the zeolite-type compound and an enlarged pore portion different from any of the one-dimensional pore, the two-dimensional pore, and the three-dimensional pore. In this case, the CO shift or reverse shift catalytic substance 20 is preferably present at least in the enlarged pore portion 12, and is more preferably embedded at least in the enlarged pore portion 12. Additionally, the enlarged pore portion 12 preferably connects with the plurality of pores 11a, 11a constituting any one of the one-dimensional pore, the two-dimensional pore, and the three-dimensional pore. As a result, a separate channel different from the one-dimensional pore, the two-dimensional pore, or the three-dimensional pore is provided in the interior of the support 10, so that the function of the CO shift or reverse shift catalytic substance 20 can be further exhibited. Here, the "one-dimensional pore" refers to a tunnel-type or cage-type pore forming a one-dimensional channel, or a plurality of tunnel-type or cage-type pores (a plurality of one-dimensional channels) forming a plurality of one-dimensional channels. Also, the "two-dimensional pore" refers to a two-dimensional channel in which a plurality of one-dimensional channels is connected two-dimensionally. The "three-dimensional pore" refers to a three-dimensional channel in which a plurality of one-dimensional channels is connected three-dimensionally. As a result, the movement of the CO shift or reverse shift catalytic substance 20 within the support 10 is further restricted, and detachment of the CO shift or reverse shift catalytic substance 20 and aggregation between the CO shift or reverse shift catalytic substances 20, 20 are more effectively prevented. The term "embedding" refers to a state in which the CO shift or reverse shift catalytic substance 20 is included in the support 10. At this time, the CO shift or reverse shift catalytic substance 20 and the support 10 need not necessarily be in direct contact with each other, but may be indirectly held by the support 10 with other substances (e.g., a surfactant, etc.) interposed between the CO shift or reverse shift catalytic substance 20 and the support 10.

Although FIG. 1B illustrates the case in which the CO shift or reverse shift catalytic substance 20 is embedded in the enlarged pore portion 12, the CO shift or reverse shift catalytic substance 20 is not limited to this configuration only, and the CO shift or reverse shift catalytic substance 20 may be present in the channel 11 with a portion thereof protruding outward of the enlarged pore portion 12. Furthermore, the CO shift or reverse shift catalytic substance 20 may be partially embedded in a portion of the channel 11 other than the enlarged pore portion 12 (for example, an inner wall portion of the channel 11), or may be held by fixing, for example.

Additionally, the channel 11 is formed three-dimensionally by including a branch portion or a merging portion within the support 10, and the enlarged pore portion 12 is preferably provided in the branch portion or the merging portion of the channel 11.

The average inner diameter $D_F$ of the channel 11 formed in the support 10 is calculated from the average value of the short diameter and the long diameter of the pore 11a constituting any of the one-dimensional pore, the two-dimensional pore, and the three-dimensional pore. For example, it is from 0.1 nm to 1.5 nm, and preferably from 0.5 nm to 0.8 nm. The inner diameter $D_E$ of the enlarged pore portion 12 is, for example, from 0.5 nm to 50 nm, preferably from 1.1 nm to 40 nm, and more preferably from 1.1 nm to 3.3 nm. For example, the inner diameter $D_E$ of the enlarged pore portion 12 depends on the pore diameter of the precursor material (A) described below and the average particle size $D_C$ of the CO shift or reverse shift catalytic substance 20 to be embedded. The inner diameter $D_E$ of the enlarged pore portion 12 is sized so that the enlarged pore portion 12 is able to embed the CO shift or reverse shift catalytic substance 20.

The support 10 is composed of a zeolite-type compound. Examples of zeolite-type compounds include zeolites (aluminosilicate), cation exchanged zeolites; silicate compounds such as zeolite analog compounds such as aluminoborate, alminoarsenate salts, and germanate salts; and phosphate-based zeolite analog materials such as molybdenum phosphate. Among these, the zeolite-type compound is preferably a silicate compound.

The framework of the zeolite-type compound is selected from FAU type (Y type or X type), MTW type, MFI type (ZSM-5), FER type (ferrierite), LTA type (A type), MWW type (MCM-22), MOR type (mordenite), LTL type (L type), and BEA type (beta type). Preferably, it is MFI type, and more preferably ZSM-5. A plurality of pores having a pore diameter corresponding to each framework is formed in the zeolite-type compound. For example, the maximum pore diameter of MFI type is 0.636 nm (6.36 Å) and the average pore diameter is 0.560 nm (5.60 Å).

The case in which the CO shift or reverse shift catalytic substance 20 is made of metal nanoparticles will be described below in detail.

The metal nanoparticles 20 are primary particles or secondary particles formed by aggregating primary particles, but the average particle size $D_C$ of the metal nanoparticles 20 is preferably larger than the average inner diameter $D_F$ of the channel 11 and not greater than the inner diameter $D_E$ of the enlarged pore portion 12 ($D_F < D_C \leq D_E$). Such metal nanoparticles 20 are suitably embedded in the enlarged pore portion 12 within the channel 11, and the movement of the metal nanoparticles 20 within the support 10 is restricted. Thus, even if the metal nanoparticles 20 are subjected to an external force from a CO-containing mixed gas containing CO and water vapor ($H_2O$) as a fluid, movement of the metal nanoparticles 20 within the support 10 is suppressed, and contact between the metal nanoparticles 20, 20, . . . present in the enlarged pore portions 12, 12, . . . dispersed in the channel 11 of the support 10 is effectively prevented.

In addition, in both the cases where the metal nanoparticles 20 are primary or secondary particles, the average particle size $D_C$ of the metal nanoparticles 20 is preferably from 0.08 nm to 30 nm, more preferably from 0.08 nm to 25 nm, and further preferably from 0.4 nm to 11.0 nm, and particularly preferably from 0.8 nm to 2.7 nm. Furthermore, the ratio ($D_C/D_F$) of the average particle size $D_C$ of the metal nanoparticles 20 to the average inner diameter $D_F$ of the channel 11 is preferably from 0.05 to 300, more preferably from 0.1 to 30, even more preferably from 1.1 to 30, and particularly preferably from 1.4 to 3.6. The metal element 20 (M) of the metal nanoparticles is preferably contained in 0.5 to 2.5 mass % relative to the structured catalyst for CO shift or reverse shift 1, and more preferably from 0.5 to 1.5 mass % relative to the structured catalyst for CO shift or reverse shift 1. For example, when the metal element (M) is Co, the content of Co element (mass %) is expressed as {(mass of Co element)/(mass of all elements in the structured catalyst for CO shift or reverse shift 1)}×100.

The metal nanoparticles only need to be nanoparticles constituted by at least one type of metal or metal oxide. For example, the metal nanoparticles may be constituted of a single metal or metal oxide, or may be constituted of a mixture of two or more types of metals or metal oxides. Note that in the present specification, the "metal" constituting the metal nanoparticles (as the raw material) refers to an elemental metal containing one type of metal element (M) and a metal alloy containing two or more types of metal elements (M), and the term is a generic term for a metal containing one or more metal elements (M). Note that in the present specification, the "metal oxide" refers to an oxide containing one type of metal element (M) and a complex oxide containing two or more types of metal elements (M), and the term is a generic name for oxides containing one or more metal elements (M).

Examples of such a metal include platinum (Pt), palladium (Pd), ruthenium (Ru), nickel (Ni), cobalt (Co), molybdenum (Mo), tungsten (W), iron (Fe), chromium (Cr), cerium (Ce), copper (Cu), magnesium (Mg), and aluminum (Al). Preferably, any one of metal described above is the major component.

Examples of such metal oxides include cobalt oxide ($CoO_x$), nickel oxide ($NiO_x$), iron oxide ($FeO_x$), copper oxide ($CuO_x$), zirconium oxide ($ZrO_x$), cerium oxide ($CeO_x$), aluminum oxide ($AlO_x$), niobium oxide ($NbO_x$), titanium oxide ($TiO_x$), bismuth oxide ($BiO_x$), molybdenum oxide ($MoO_x$), vanadium oxide ($VO_x$), and chromium oxide ($CrO_x$). Preferably, any one of oxides described above is the major component.

Among the metal nanoparticles constituted of a metal or metal oxide described above, the metal nanoparticles are preferably nanoparticles composed of at least one type of metal or metal oxide selected from the group consisting of cobalt, nickel, iron, and copper, more preferably nanoparticles composed of at least one type of metal or metal oxide selected from the group consisting of cobalt, iron, and copper, and is particularly preferably nanoparticles composed of copper or copper oxide.

Furthermore, the ratio of silicon (Si) constituting the support 10 to the metal element (M) constituting the metal nanoparticles 20 (the ratio of number of atoms Si/M) is preferably from 10 to 1000, and more preferably from 50 to 200. If the ratio is greater than 1000, the CO shift or reverse shift catalytic activity reduces, so that the action of the CO shift or reverse shift catalytic substance may not be sufficiently obtained. On the other hand, if the ratio is smaller than 10, the proportion of the metal nanoparticles 20 becomes too large, and the strength of the support 10 tends to decrease. Note that the metal nanoparticles 20 refer to the nanoparticles that are held or supported in the support 10, and do not include metal nanoparticles adhered to the outer surface of the support 10.

Function of Structured Catalyst for CO Shift and Reverse Shift

The structured catalyst for CO shift or reverse shift 1 includes the support 10 of a porous structure and at least one CO shift or reverse shift catalytic substance 20 present in the support 10, as described above. The structured catalyst for CO shift 1 exhibits CO shift catalytic capacity of the CO shift catalytic substance 20 present in the support 10 by contact of the CO shift catalytic substance 20 with a CO-containing mixed gas. In particular, the CO-containing mixed gas in contact with the outer surface 10*a* of the structured catalyst for CO shift 1 flows into the support 10 through the pore 11*a* formed in the outer surface 10*a* and guided into the channel 11, moves through the channel 11, and exits to the exterior of the structured catalyst for CO shift 1 through the other pore 11*a*. In the pathway through which the CO-containing mixed gas travels through the channel 11, contacting with the CO shift catalytic substance 20 held in the channel 11 results in a CO shift catalytic reaction of the CO shift catalytic substance 20.

Similarly, the structured catalyst for reverse shift 1 exhibits reverse shift catalytic capacity by the reverse shift catalytic substance 20 by contact of the reverse shift catalytic substance 20 present in the support 10 with the $CO_2$ containing mixed gas containing $CO_2$ and $H_2$. In particular, the $CO_2$-containing mixed gas in contact with the outer surface 10*a* of the structured catalyst for reverse shift 1 flows into the support 10 through the pore 11*a* formed in the outer surface 10*a* and guided into the channel 11, moves through the channel 11, and exits to the exterior of the structured catalyst for reverse shift 1 through the other pore 11*a*. In the pathway through which the $CO_2$-containing mixed gas travels through the channel 11, contacting with the reverse shift catalytic substance 20 held in the channel 11 results in a reverse shift catalytic reaction of the reverse shift catalytic substance 20.

Figure 2A:
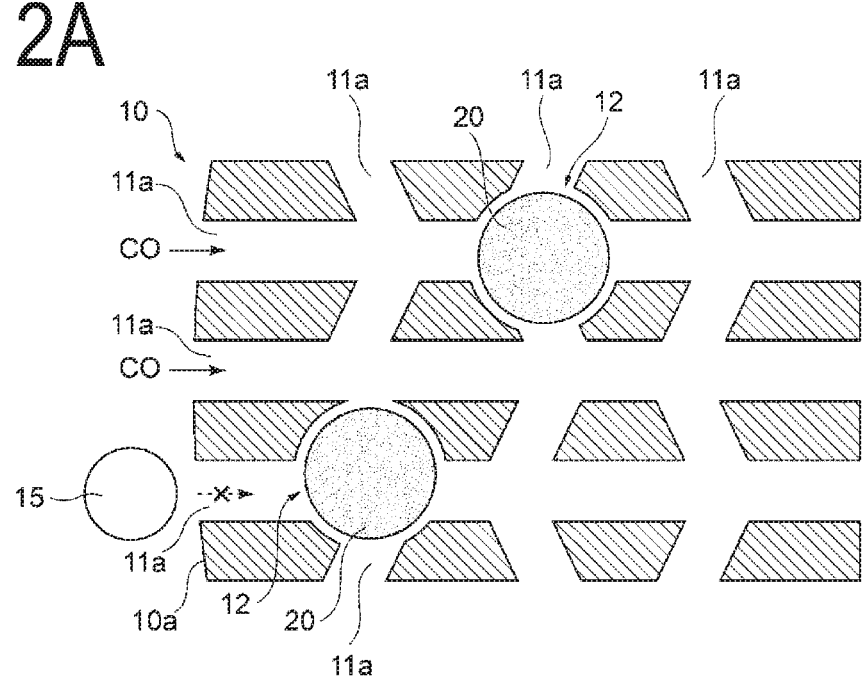
FIGS. 2A and 2B are partial enlarged cross-sectional views for explaining an example of the function of the structured catalyst for CO shift or reverse shift of FIGS. 1A and 1B.

In addition, the structured catalyst for CO shift or reverse shift 1 has molecular sieving capability due to the support 10 being a porous structure. Firstly, the molecular sieving capability of the structured catalyst for CO shift or reverse shift 1 to transmit $H_2$, $H_2O$, CO, and $CO_2$, which are contained in the synthetic gas as a fluid, is described below. As illustrated in FIG. 2A, molecules of $H_2$, $H_2O$, CO, and $CO_2$ having a size that is less than or equal to the pore diameter of the pore 11a, in other words, less than or equal to the inner diameter of the channel 11, can flow into the support 10. On the other hand, other molecule 15 having a size exceeding the pore diameter of the pore 11a cannot flow into the support 10. In this way, when the CO-containing mixed gas and the $CO_2$-containing mixed gas contain a plurality of types of compounds, the reaction of compounds that cannot flow into the support 10 is restricted, and a compound capable of flowing into the support 10 is allowed to react.

Of the compounds produced in the support 10 by the reaction, only compounds composed of molecules having a size less than or equal to the pore diameter of the pore 11a can exit through the pore 11a to the exterior of the support 10, and are obtained as reaction products. On the other hand, a compound that cannot exit to the exterior of the support 10 from the pore 11a can be released to the exterior of the support 10 when converted into a compound made up of molecules sized to be able to exit to the exterior of the support 10. In this way, a specified reaction product can be selectively obtained by using the structured catalyst for CO shift or reverse shift 1.

Figure 2B:
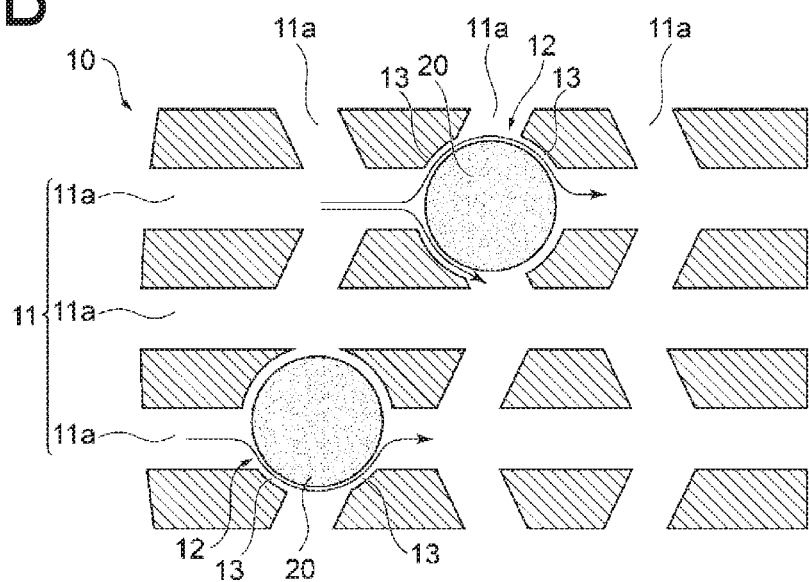

In the structured catalyst for CO shift or reverse shift 1, as illustrated in FIG. 2B, the CO shift or reverse shift catalytic substance 20 is embedded in the enlarged pore portion 12 of the channel 11. When the CO shift or reverse shift catalytic substance 20 is made of metal nanoparticles, if the average particle size $D_C$ of the metal nanoparticles is larger than the average inner diameter Dr of the channel 11 and smaller than the inner diameter $D_E$ of the enlarged pore portion 12 ($D_F<D_C<D_E$), a small channel 13 is formed between the metal nanoparticles and the enlarged pore portion 12. Thus, as indicated by the arrow in FIG. 2B, the CO-containing mixed gas or $CO_2$-containing mixed gas that has flown into the small channel 13 comes into contact with the metal nanoparticles. Because these metal nanoparticles are embedded in the enlarged pore portion 12, movement within the support 10 is restricted. As a result, aggregation between the metal nanoparticles in the support 10 is prevented. As a result, a large contact area is stably maintained between the metal nanoparticles and the CO-containing mixed gas or the $CO_2$-containing mixed gas as a fluid.

When the CO-containing mixed gas or the $CO_2$-containing mixed gas that has flown into the channel 11 contacts the CO shift or reverse shift catalytic substance 20, by the catalytic reaction of the CO shift or reverse shift catalytic substance 20, CO and $H_2O$ are modified to $CO_2$ and $H_2$ in the CO shift reaction, and $CO_2$ and $H_2$ are modified to CO and $H_2O$ in the reverse shift reaction.

CO Shift or Reverse Shift Reactor

A CO shift or reverse shift reactor having a structured catalyst for CO shift or reverse shift may be formed using the structured catalyst for CO shift or reverse shift 1. Using the structured catalyst for CO shift or reverse shift 1 according to the embodiment described above, a CO shift or reverse shift reactor that achieves the same effects as described above is obtained.

Method for Producing Structured Catalyst for CO Shift or Reverse Shift

Figure 3:
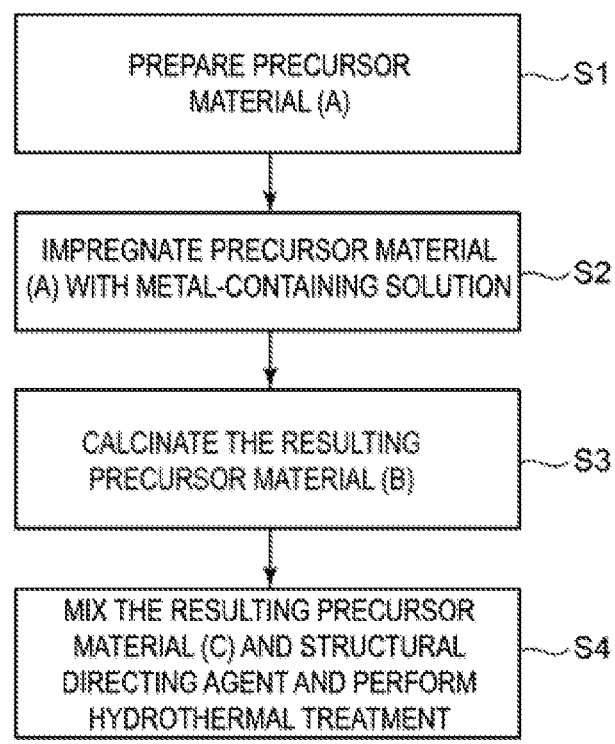
FIG. 3 is a flowchart illustrating an example of a method for producing the structured catalyst for CO shift or reverse shift of FIGS. 1A and 1B.

FIG. 3 is a flowchart illustrating a method for producing the structured catalyst for CO shift or reverse shift 1 of FIGS. 1A and 1B. An example of the method for producing the structured catalyst for CO shift or reverse shift will be described below as an example of the case in which the CO shift or reverse shift catalytic substance present in the support is made of metal nanoparticles.

Step S1: Preparation step

As illustrated in FIG. 3, firstly, the precursor material (A) is prepared for obtaining a support of a porous structure composed of the zeolite-type compound. The precursor material (A) is preferably a regular mesopore material, and may be appropriately selected according to the type (composition) of the zeolite-type compound constituting the support of the structured catalyst for CO shift or reverse shift.

Here, when the zeolite-type compound constituting the support of the structured catalyst for CO shift or reverse shift is a silicate compound, the regular mesopore material is preferably a compound including a Si—O skeleton in which pores having a pore diameter of 1 to 50 nm are uniformly sized and regularly developed one-dimensionally, two-dimensionally, or three-dimensionally. While such a regular mesopore material is obtained as a variety of synthetic materials depending on the synthetic conditions. Specific examples of the synthetic material include SBA-1, SBA-15, SBA-16, KIT-6, FSM-16, and MCM-41. Among them, MCM-41 is preferred. Note that the pore diameter of SBA-1 is from 10 to 30 nm, the pore diameter of SBA-15 is from 6 to 10 nm, the pore diameter of SBA-16 is 6 nm, the pore diameter of KIT-6 is 9 nm, the pore diameter of FSM-16 is from 3 to 5 nm, and the pore diameter of MCM-41 is from 1 to 10 nm. Examples of such a regular mesopore material include mesoporous silica, mesoporous aluminosilicate, and mesoporous metallosilicate.

The precursor material (A) may be a commercially available product or a synthetic product. When the precursor material (A) is synthesized, it can be synthesized by a known method for synthesizing a regular mesopore material. For example, a mixed solution including a raw material containing the constituent elements of the precursor material (A) and a molding agent for defining the structure of the precursor material (A) is prepared, and the pH is adjusted as necessary to perform hydrothermal treatment (hydrothermal synthesis). Thereafter, the precipitate (product) obtained by hydrothermal treatment is recovered (e.g., filtered), washed and dried as necessary, and then calcined to obtain a precursor material (A) which is a powdered regular mesopore material. Here, examples of the solvent of the mixed solution that can be used include water, an organic solvent such as alcohol, or a mixed solvent thereof. In addition, the raw material is selected according to the type of the support, and its examples include silica agents such as tetraethoxysilane (TEOS), fumed silica, and quartz sand. In addition, various types of surfactants, block copolymers, and the like can be used as the molding agent, and it is preferably selected depending on the type of the synthetic materials of the regular mesopore material. For example, a surfactant such as hexadecyltrimethylammonium bromide is preferable when producing MCM-41.

The hydrothermal treatment can be performed at from 0 to 2000 kPa at 80 to 800° C. for 5 hours to 240 hours in a sealed container. For example, the calcination treatment may be performed in air, at 350 to 850° C. for 2 hours to 30 hours.

Step S2: Impregnating step

The prepared precursor material (A) is then impregnated with the metal-containing solution to obtain the precursor material (B).

The metal-containing solution is a solution containing a metal component (for example, a metal ion) corresponding to the metal element (M) constituting the metal nanoparticles of the structured catalyst for CO shift or reverse shift, and can be prepared, for example, by dissolving a metal salt containing a metal element (M) in a solvent. Examples of such metal salts include metal salts such as chlorides, hydroxides, oxides, sulfates, and nitrates. Of these, nitrates are preferable. Examples of the solvent that can be used include water, an organic solvent such as alcohol, or a mixed solvent thereof.

The method for impregnating the precursor material (A) with the metal-containing solution is not particularly limited; however, for example, the metal-containing solution is preferably added in portions in a plurality of times while mixing the powdered precursor material (A) before the calcination step described below. In addition, the surfactant is preferably added to the precursor material (A) as the additive before adding the metal-containing solution to the precursor material (A) from the perspective of allowing the metal-containing solution to enter the pores of the precursor material (A) more easily. It is believed that such additives serve to cover the outer surface of the precursor material (A) and inhibit the subsequently added metal-containing solution from adhering to the outer surface of the precursor material (A), making it easier for the metal-containing solution to enter the pores of the precursor material (A).

Examples of such additives include non-ionic surfactants such as polyoxyethylene oleyl ether, polyoxyethylene alkyl ether, and polyoxyethylene alkylphenyl ether. It is believed that these surfactants do not adhere to the interior of the pores because their molecular size is large and cannot enter the pores of the precursor material (A), and will not interfere with the penetration of the metal-containing solution into the pores. As the method for adding the non-ionic surfactant, for example, it is preferable to add from 50 to 500 mass % of the non-ionic surfactant to the precursor material (A) prior to the calcination step described below. If the added amount of the non-ionic surfactant to the precursor material (A) is less than 50 mass %, the aforementioned suppressing action will not easily occur, and when greater than 500 mass % of the non-ionic surfactant is added to the precursor material (A), the viscosity is too high, which is not preferable. Thus, the added amount of the non-ionic surfactant to the precursor material (A) is a value within the range described above.

Furthermore, the added amount of the metal-containing solution added to the precursor material (A) is preferably adjusted as appropriate in consideration of the amount of the metal element (M) contained in the metal-containing solution with which the precursor material (A) is impregnated (that is, the amount of the metal element (M) present in the precursor material (B)). For example, prior to the calcination step described below, the value obtained by converting the added amount of the metal-containing solution added to the precursor material (A) to a ratio of silicon (Si) constituting the precursor material (A) to a metal element (M) included in the metal-containing solution added to the precursor material (A) (the ratio of number of atoms Si/M) is preferably adjusted to from 10 to 1000, and more preferably from 50 to 200. For example, when the surfactant is added to the precursor material (A) as an additive prior to adding the metal-containing solution to the precursor material (A), the value obtained by converting the added amount of the metal-containing solution added to the precursor material (A) to a ratio of number of atoms Si/M is adjusted to from 50 to 200, thereby including the metal element (M) of the metal nanoparticles in the structured catalyst for CO shift or reverse shift in an amount from 0.5 to 2.5 mass %.

In the state of the precursor material (B), the added amount of the metal element (M) present within the pores is generally proportional to the amount of the metal-containing solution added to the precursor material (A) in a case where the metal concentration of the metal-containing solution, the presence or absence of additives, and other conditions such as temperature and pressure are the same. The amount of the metal element (M) present in the precursor material (B) is also in a proportional relationship to the amount of the metal element constituting the metal nanoparticles embedded in the support of the structured catalyst for CO shift or reverse shift. Thus, by controlling the amount of the metal-containing solution added to the precursor material (A) to the range described above, the pores of the precursor material (A) can be sufficiently impregnated with the metal-containing solution, and thus the amount of the metal nanoparticles present in the support of the structured catalyst for CO shift or reverse shift can be adjusted.

After impregnating the precursor material (A) with the metal-containing solution, a washing treatment may be performed as necessary. Examples of the solvent of the washing solution that can be used include water, an organic solvent such as alcohol, or a mixed solvent thereof. Furthermore, the precursor material (A) is preferably impregnated with the metal-containing solution, and after the washing treatment is performed as necessary, the precursor material (A) is further subjected to drying treatment. Drying treatments include overnight natural drying and high temperature drying at 150° C. or lower. Note that when calcination treatment described below is performed in the state in which there is a large amount of moisture remaining in the metal-containing solution and the wash solution in the precursor material (A), the skeletal structure as the regular mesopore material of the precursor material (A) may be broken, and thus it is preferable to dry them sufficiently.

Step S3: Calcination step

Next, a precursor material (C) is obtained by calcining the precursor material (B) obtained by impregnating the precursor material (A) for obtaining the support of the porous structure composed of zeolite-type compound with the metal-containing solution.

For example, the calcination treatment is preferably performed in air, at 350 to 850° C. for 2 hours to 30 hours. The metal component that has impregnated the pores of the regular mesopore material undergoes crystal growth by the calcination treatment, and metal nanoparticles are formed in the pores.

Step S4: Hydrothermal treatment step

A mixed solution of the precursor material (C) and the structure directing agent is then prepared, and the precursor material (C) obtained by calcining the precursor material (B) is hydrothermally treated to obtain a structured catalyst for CO shift or reverse shift.

The structure directing agent is a molding agent for defining the skeletal structure of the support of the structured catalyst for CO shift or reverse shift, and may be, for example, a surfactant. The structure directing agent is preferably selected according to the skeletal structure of the support of the structured catalyst for CO shift or reverse shift, and is preferably, for example, a surfactant such as tetramethylammonium bromide (TMABr), tetraethylammonium bromide (TEABr), and tetrapropylammonium bromide (TPABr).

The mixing of the precursor material (C) and the structure directing agent may be performed during the hydrothermal treatment step or may be performed before the hydrothermal treatment step. Furthermore, the method for preparing the mixed solution is not particularly limited, and the precursor material (C), the structure directing agent, and the solvent may be mixed simultaneously, or each of the dispersion solutions may be mixed after the precursor material (C) and the structure directing agent are each dispersed in individual solutions. Examples of the solvent that can be used include water, an organic solvent such as alcohol, or a mixed solvent thereof. In addition, it is preferable that the pH of the mixed solution is adjusted using an acid or a base prior to performing the hydrothermal treatment.

The hydrothermal treatment can be performed by a known method. For example, the hydrothermal treatment can be preferably performed at from 0 to 2000 kPa at 80 to 800° C. for 5 hours to 240 hours in a sealed container. Furthermore, the hydrothermal treatment is preferably performed under a basic condition. Although the reaction mechanism here is not necessarily clear, by performing hydrothermal treatment using the precursor material (C) as a raw material, the skeletal structure as the regular mesopore material of the precursor material (C) becomes increasingly disrupted. However, the action of the structure directing agent forms a new skeletal structure (porous structure) as the support of the structured catalyst for CO shift or reverse shift while maintaining the position of the metal nanoparticles within the pores of the precursor material (C). The structured catalyst for CO shift or reverse shift obtained in this way includes the support having the porous structure and metal nanoparticles present in the support, and the support has a channel in which the plurality of pores connect with each other by the porous structure, and at least a portion of the metal nanoparticles are present in the channel of the support. Furthermore, in the present embodiment, in the hydrothermal treatment step, a mixed solution in which the precursor material (C) and the structure directing agent are mixed is prepared, and the precursor material (C) is subjected to hydrothermal treatment, which is not a limitation. The precursor material (C) may be subjected to hydrothermal treatment without mixing the precursor material (C) and the structure directing agent.

The precipitate obtained after hydrothermal treatment (structured catalyst for CO shift or reverse shift) is preferably washed, dried, and calcined as necessary after recovery (e.g., filtration). Examples of the washing solution that can be used include water, an organic solvent such as alcohol, or a mixed solution thereof. Drying treatments include overnight natural drying and high temperature drying at 150° C. or lower. Note that when calcination treatment is performed in the state in which there is a large amount of moisture remaining in the precipitate, the skeletal structure as a support of the structured catalyst for CO shift or reverse shift may be broken, and thus it is preferable to dry the precipitate sufficiently. For example, the calcination treatment may be performed in air, at 350 to 850° C. for 2 hours to 30 hours. Such calcination treatment burns out the structure directing agent that has been attached to the structured catalyst for CO shift or reverse shift. Furthermore, the structured catalyst for CO shift or reverse shift may be used as-is without subjecting the recovered precipitate to calcination, depending on the intended use. For example, if the environment in which the structured catalyst for CO shift or reverse shift is used is a high temperature environment in an oxidizing atmosphere, exposing the structured catalyst for CO shift or reverse shift to a usage environment for a period of time allows the structure directing agent to be burned out and to obtain a structured catalyst for CO shift or reverse shift similar to that when subjected to calcination treatment. Thus, the obtained structured catalyst for CO shift or reverse shift can be used as is.

The producing method described above is an example in which the metal element (M) contained in the metal-containing solution that impregnates the precursor material (A) is a metal species resistant to oxidization (e.g., a noble metal).

When the metal element (M) contained in the metal-containing solution that impregnates the precursor material (A) is an easily oxidized metal species (e.g., Fe, Co, or Cu), the hydrothermally treated precursor material (C) is preferably subjected to reduction treatment after the hydrothermal treatment step. If the metal element (M) contained in the metal-containing solution is an easily oxidized metal species, the metal component is oxidized by the heat treatment in the step (steps S3 to S4) after the impregnating step (step S2). Therefore, metal oxide nanoparticles are present in the support formed in the hydrothermal treatment step (step S4). Therefore, in order to obtain a structured catalyst for CO shift or reverse shift in which metal nanoparticles are present in the support, it is desirable to sinter the recovered precipitate after the hydrothermal treatment, and further reduce it in a reducing gas atmosphere such as hydrogen gas (step S5: reduction treatment step). The reduction treatment reduces the metal oxide nanoparticles present in the support, and metal nanoparticles corresponding to the metal element (M) constituting the metal oxide nanoparticles are formed. As a result, a structured catalyst for CO shift or reverse shift in which metal nanoparticles are present in the support is obtained. The reduction treatment may be performed as necessary. For example, in a case where the environment in which the structured catalyst for CO shift or reverse shift is used is a reducing atmosphere, the metal oxide nanoparticles are reduced by exposing the structural body to a usage environment for a certain period of time, so that a structured catalyst for CO shift or reverse shift similar to that obtained when subjected to reduction treatment is obtained. Thus, the obtained structured catalyst for CO shift or reverse shift can be used in the form including oxide nanoparticles in the support.

Modified Example of Structured Catalyst for CO Shift or Reverse Shift

Figure 4:
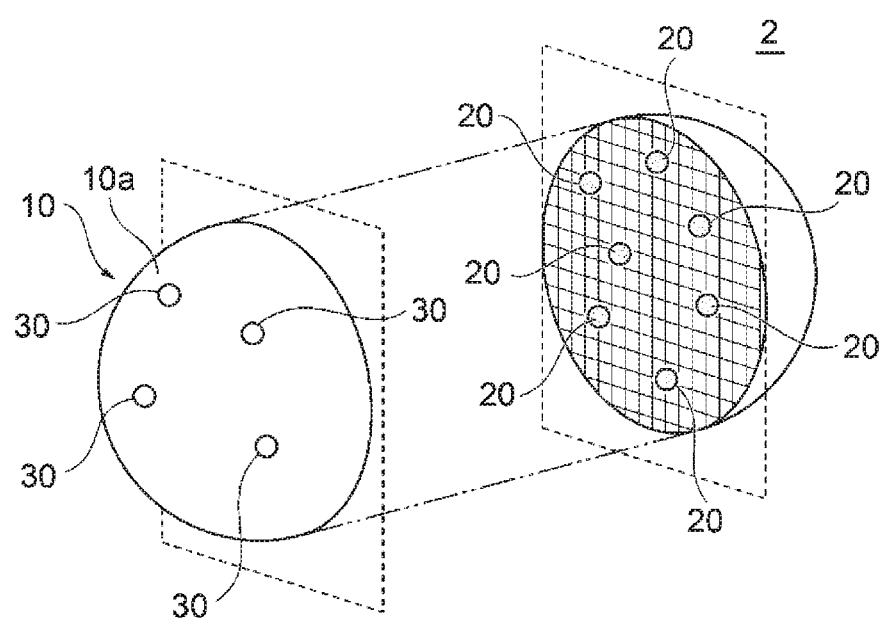
FIG. 4 is a schematic view illustrating a modified example of the structured catalyst for CO shift or reverse shift of FIGS. 1A and 1B.

FIG. 4 is a schematic view illustrating a modified example of the structured catalyst for CO shift or reverse shift 1 in FIGS. 1A and 1B. Although the structured catalyst for CO shift or reverse shift 1 of FIGS. 1A and 1B illustrates the case in which it includes the support 10 and the CO shift or reverse shift catalytic substance 20 present in the support 10, the structured catalyst for CO shift or reverse shift 1 is not limited to this configuration. For example, as illustrated in FIG. 4, the structured catalyst for CO shift or reverse shift 2 may further include at least one CO shift or reverse shift catalytic substance 30 held on the outer surface 10a of the support 10.

This CO shift or reverse shift catalytic substance 30 is a substance that exhibits one or more catalytic capacities. The catalytic capacity of the other CO shift or reverse shift catalytic substance 30 may be the same or different from the catalytic capacity of the CO shift or reverse shift catalytic substance 20. Also, in a case where both of the CO shift or reverse shift catalytic substances 20 and 30 are substances having the same catalytic capacity, the material of the other CO shift or reverse shift catalytic substance 30 may be the same as or different from the material of the CO shift or reverse shift catalytic substance 20. According to this configuration, the content of the CO shift or reverse shift catalytic substance held in the structured catalyst for CO shift or reverse shift 2 can be increased, and the catalytic activity of the CO shift or reverse shift catalytic substance can be further promoted.

In this case, the content of the CO shift or reverse shift catalytic substance 20 present in the support 10 is preferably greater than that of the other CO shift or reverse shift catalytic substance 30 held on the outer surface 10a of the support 10. As a result, the catalytic capacity of the CO shift or reverse shift catalytic substance 20 held inside the support 10 becomes dominant, and catalytic capacities of the CO shift or reverse shift catalytic substances are stably exhibited.

Method for Producing Carbon Dioxide and Hydrogen

In addition, in the present disclosure, a method for producing carbon dioxide and hydrogen that generates carbon dioxide and hydrogen from carbon monoxide and water (water vapor) using a catalyst is provided. The catalyst includes a support 10 of a porous structure composed of a zeolite-type compound, and at least one type of metal nanoparticles 20 present in the support 10, in which the support 10 has channels 11 connecting with each other, and the metal nanoparticles 20 includes a structured catalyst for CO shift 1 present at least in an enlarged pore portion 12 of the channels 11 of the support 10. That is, the present disclosure provides a method for producing carbon dioxide and hydrogen that generates carbon dioxide and hydrogen from carbon monoxide and water (water vapor) using the structured catalyst for CO shift described above.

The raw material used in the method for producing carbon dioxide and hydrogen using the CO shift reaction is not particularly limited as long as it is a synthetic gas composed mainly of gaseous water and carbon monoxide, and is preferably a synthetic gas having the molar ratio of water vapor to carbon monoxide in the raw material gas of from 1 to 100. The reaction conditions in the CO shift reaction may be set according to, for example, the concentration of the gas component in the raw material gas and the content of the catalyst component. Normally, the reaction temperature in the CO shift reaction is preferably from 150 to 300° C., the reaction pressure is preferably from 1 to 100 atmospheres (absolute pressure), and the space velocity of the raw material gas (excluding water vapor) is preferably from 1000 to 100000 (1/h).

The CO shift reaction may be carried out in a known process of CO shift reaction, for example, in a fixed bed, a supercritical fixed bed, a slurry bed, or a fluidized bed. In this way, when producing carbon dioxide and hydrogen from carbon monoxide and water (water vapor), that is, in a CO shift reaction, the used of the structured catalyst for CO shift according to the present disclosure allows to obtain the same effects as those exhibited by the structured catalyst for CO shift in the above-described method for producing carbon dioxide and hydrogen.

In addition, the present disclosure may provide a method for producing carbon dioxide and hydrogen, including converting carbon monoxide and water to carbon dioxide and hydrogen using the CO shift reactor described above. The CO shift reactor is not particularly limited as long as it is capable performing a CO shift reaction using the above-described structured catalyst for CO shift, and may be a commonly used reactor such as a reaction vessel, a reaction tube, or a reaction column. The use of the CO shift reactor having a structured catalyst for CO shift allows to achieve the same effect as those exhibited by the structured catalyst for CO shift described above.

Method for Producing Carbon Monoxide and Water

Furthermore, in the present disclosure, a method for producing carbon monoxide and water that produces carbon monoxide and water (water vapor) from carbon dioxide and hydrogen using a catalyst is also provided. The catalyst includes a support 10 of a porous structure composed of a zeolite-type compound, and at least one type of metal nanoparticles 20 present in the support 10, the support 10 having channels 11 connecting with each other, and the metal nanoparticles 20 including a structured catalyst for reverse shift 1 present at least in the enlarged pore portion 12 of the channels 11 of the support 10. That is, the present disclosure provides a method for producing carbon monoxide and water that produces carbon monoxide and water (water vapor) from carbon dioxide and hydrogen using the structured catalyst for reverse shift described above.

The raw material used in the method for producing carbon monoxide and water using such a reverse shift reaction is not particularly limited as long as it is a synthetic gas composed mainly of molecular hydrogen and carbon dioxide. In addition, when performing the method for producing CO and $H_2$ using the reverse shift reaction, the compositions of $CO_2$, $H_2$, CO, and $H_2O$ are controlled by chemical equilibrium, and the composition of the resulting gas depends on the reaction temperature and the $CO_2/H_2$ ratio of the raw material gas. In order to obtain a synthetic gas, unreacted $CO_2$ and generated $H_2O$ are removed from the gas after reaction to increase the proportion of $H_2$ in the raw material gas, thereby increasing the proportion of $H_2$ in the resulting synthetic gas. The reverse shift reaction may be effectively performed at a reaction temperature of 300° C. or higher and 900° C. or lower, and the reaction temperature is preferably from 400° C. to 850° C., and more preferably from 500° C. to 800° C. When the reaction temperature is lower than 300° C., the carbon acid gas tends not to be sufficiently converted to carbon monoxide because of equilibrium. On the other hand, when the reaction temperature exceeds 900° C., the performance of the associated equipment such as piping must be improved, and this is not preferable from the perspective of producing costs.

The reverse shift reaction may also be performed by a known reaction process of a reverse shift reaction, for example, in a fixed bed, a supercritical fixed bed, a slurry bed, or a fluidized bed. In this manner, carbon monoxide and water (water vapor) are generated from carbon dioxide and hydrogen, or in reverse shift reaction, the use of the structured catalyst for reverse shift according to the present disclosure allows to obtain the same effects as those exhibited by the structured catalyst for reverse shift even in the method for producing carbon monoxide and water described above.

The present disclosure may also provide a method for producing carbon monoxide and water by converting carbon dioxide and hydrogen to carbon monoxide and water (water vapor) using the reverse shift reactor described above. The reverse shift reactor is not particularly limited as long as it can perform reverse shift reaction using the structured catalyst for reverse shift, and may be a common reactor such as a reaction vessel, a reaction tube, or a reaction column. The use of the reverse shift reactor having the structured catalyst for reverse shift allows to obtain the same effect as that exhibited by the structured catalyst for reverse shift.

As described above, the structured catalyst for CO shift or reverse shift according to the present disclosure is a catalyst that can be applied to both the CO shift reaction and the reverse shift reaction, and can realize a long life by suppressing the decrease in catalytic function in both reactions. In particular, since such a structured catalyst for CO shift or reverse shift exhibits high catalytic activity, for example, the use of the structured catalyst for reverse shift in a reverse shift reaction allows a reverse shift reaction in a high temperature environment that could not be achieved by related art.

Hereinbefore, a structured catalyst for CO shift or reverse shift, a method for producing the same, a CO shift or reverse shift reactor, a method for producing carbon dioxide and hydrogen, and a method for producing carbon monoxide and water according to the embodiments of the present disclosure have been described, but the present disclosure is not limited to the above embodiments, and various modifications and changes are possible on the basis of the technical concept of the present disclosure.

EXAMPLES

Example 1 to 384

Synthesis of Precursor Material (A)

A mixed aqueous solution was prepared by mixing a silica agent (tetraethoxysilane (TEOS), manufactured by Wako Pure Chemical Industries, Ltd.) and a surfactant as the molding agent. The pH was adjusted as appropriate, and hydrothermal treatment was performed at 80 to 350° C. for 100 hours in a sealed container. Thereafter, the produced precipitate was filtered out, washed with water and ethanol, and then calcined in air at 600° C. for 24 hours to obtain the precursor material (A) of the type and having the pore diameter shown in Tables 1 to 8. Note that the following surfactant was used depending on the type of the precursor material (A).

MCM-41: Hexadecyltrimethylammonium bromide (CTAB) (manufactured by Wako Pure Chemical Industries, Ltd.)
SBA-1: Pluronic P123 (available from BASF)

Fabrication of Precursor Material (B) and (C)

Next, a metal-containing aqueous solution was prepared by dissolving a metal salt containing the metal element (M) in water according to the metal element (M) constituting the metal nanoparticles of the type shown in Tables 1 to 8. Following metal salts were used in accordance with the type of metal nanoparticles ("metal nanoparticles: metal salt").

Co: Cobalt nitrate (II) hexahydrate (available from Wako Pure Chemical Industries, Ltd.)
Ni: Nickel nitrate (II) hexahydrate (available from Wako Pure Chemical Industries, Ltd.)
Fe: Iron nitrate (III) nonahydrate (available from Wako Pure Chemical Industries, Ltd.)
Cu: Copper nitrate (II) trihydrate (available from Wako Pure Chemical Industries, Ltd.)

Next, a metal-containing solution was added to the powdered precursor material (A) in portions, and dried at room temperature (20° C.±10° C.) for 12 hours or longer to obtain the precursor material (B).

Note that when the presence or absence of additives shown in Tables 1 to 8 is "yes", pretreatment in which an aqueous solution of polyoxyethylene (15) oleyl ether (NIKKOL BO-15 V, available from Nikko Chemicals Co., Ltd.) is added as the additive to the precursor material (A) prior to adding the metal-containing aqueous solution, and then the aqueous solution containing a metal was added as described above. Note that when "no" is used in the presence or absence of an additive, pretreatment with an additive such as that described above has not been performed.

Furthermore, the added amount of the metal-containing aqueous solution added to the precursor material (A) was adjusted so that the value obtained by converting to a ratio of silicon (Si) constituting the precursor material (A) to a metal element (M) included in the metal-containing solution is in Tables 1 to 8.

Next, the precursor material (B) impregnated with the metal-containing aqueous solution obtained as described above was calcined in air at 600° C. for 24 hours to obtain the precursor material (C).

The precursor material (C) obtained as described above and the structure directing agent shown in Tables 1 to 8 were mixed to produce a mixed aqueous solution. Hydrothermal treatment was performed under the conditions of at 80 to 350° C., at pH and time shown in Tables 1 to 8 in a sealed container. Thereafter, the produced precipitate was filtered off, washed with water, dried at 100° C. for 12 hours or longer, and then calcined in air at 600° C. for 24 hours. The calcined product was then recovered and reduction treatment was performed under the inflow of hydrogen gas at 400° C. for 350 minutes to obtain catalytic structural bodies containing a support and metal nanoparticles as a catalytic substance shown in Tables 1 to 8 (Examples 1 to 384).

Comparative Example 1

In Comparative Example 1, cobalt oxide powder (II, III) having an average particle size of 50 nm or less (available from Sigma-Aldrich Japan LLC) was mixed with MFI type silicalite, hydrogen reduction treatment was performed in the same manner as Example, thus obtaining a structured catalyst in which cobalt oxide nanoparticles were attached as the catalytic substance to the outer surface of the silicalite as the support. MFI type silicalite was synthesized in the similar manner as in Examples 52 to 57 except for a step of adding a metal.

Comparative Example 2

In Comparative Example 2, MFI type silicalite was synthesized in the similar manner as in Comparative Example 1 except that the step of attaching the cobalt oxide nanoparticles was omitted.

Evaluation

The catalytic structural bodies of the above examples including a support and a catalytic substance, and the silicalite of the comparative examples were subjected to various characteristic evaluation under the conditions described below.

[A] Cross sectional observation

An observation sample was produced using a pulverization method for the structured catalyst of the examples and silicalite of the comparative examples described above, and the cross section observation was performed using a transmission electron microscope (TEM) (TITAN G2, available from FEI). As a result, it was confirmed that, in the structured catalyst of the example described above, the catalytic substance was present and held inside the support made of silicalite or zeolite. On the other hand, in the silicalite of Comparative Example 1, the catalytic substances were only attached to the outer surface of the support and were not present inside the support.

In addition, of the examples described above, the catalytic structural bodies wherein the metal was nanoparticles of Fe, cobalt, and nickel (Fe, Co, and Ni), the cross section was cut out by FIB (focused ion beam) processing, and the section element analysis was performed using SEM (SU8020, manufactured by Hitachi High-Technologies Corporation) and EDX (X-Max, available from HORIBA, Ltd.). As a result, Fe, Co, Ni elements were detected from the inside of the supports. It was confirmed that iron nanoparticles, cobalt nanoparticles, and nickel nanoparticles were present in the supports from the results of the cross-sectional observation using TEM and SEM/EDX.

[B] Average inner diameter of the channels of the support and average particle size of the catalytic substance In the TEM image taken by the cross-sectional observation performed in evaluation [A] above, 500 channels of the support were randomly selected, and the respective major diameter and the minor diameter were measured, and the respective inner diameters were calculated from the average values (N=500), and the average value of the inner diameter was determined to be the average inner diameter $D_F$ of the channels of the support. In addition, for the catalytic substances, 500 catalytic substances were randomly selected from the TEM image, and the respective particle sizes were measured (N=500), and the average value thereof was determined to be the average particle size $D_C$ of the catalytic substance. The results are shown in Tables 1 to 8.

Also, SAXS (small angle X-ray scattering) was used to analyze the average particle size and dispersion status of the catalytic substance. Measurements by SAXS were performed using a Spring—8 beam line BL19B2. The obtained SAXS data was fitted with a spherical model using the Guinier approximation method, and the particle size was calculated. The particle size was measured for the structured catalyst including iron nanoparticles as metal. Furthermore, as a comparative reference, commercially available iron nanoparticles (available from Wako) were observed and measured on SEM.

As a result, in commercial products, various sizes of iron nanoparticles were randomly present in a range of particle sizes of approximately 50 nm to 400 nm, whereas in the measurement results of SAXS, scattering peaks with particle sizes of 10 nm or less were also detected in the catalytic structural bodies of each example having an average particle size from 1.2 nm to 2.0 nm determined from the TEM image. From the results of SAXS measurement and the SEM/EDX cross-sectional measurement, it was found that catalytic substances having a particle size of 10 nm or less were present in the support in a dispersed state with uniform particle sizes and very high dispersion.

[C] Relationship between the added amount of the metal-containing solution and the amount of metal embedded in the support A structured catalyst in which metal nanoparticles were embedded in the support at added amount of the ratio of number of atoms of Si/M=50, 100, 200, 1,000 (M=Co, Ni, Fe, and Cu) was produced, and then the amount of metal (mass %) that was embedded in the support of the structured catalyst produced at the above added amount was measured. Note that in the present measurement, the catalytic structural bodies having the ratio of number of atoms of Si/M=100, 200, and 1000 were produced by adjusting the added amount of the metal-containing solution in the same manner as the structured catalyst with the ratio of number of atoms of Si/M=100, 200, and 1000 of Examples 1 to 384, and the catalytic structural bodies with Si/M=50 ratio of number of atoms were made in the same manner as the structured catalyst with the ratio of number of atoms of Si/M=100, 200, and 1000, except that the added amount of the metal-containing solution was varied.

The amount of metal was quantified by ICP (radiofrequency inductively coupled plasma) alone or in combination with ICP and XRF (fluorescence X-ray analysis). XRF (energy dispersive fluorescent x-ray analyzer "SEA1200VX", manufactured by SII Nanotechnology Inc.) was performed under conditions of a vacuum atmosphere, an accelerating voltage 15 kV (using a Cr filter), or an accelerating voltage 50 kV (using a Pb filter). XRF is a method for calculating the amount of metal present in terms of fluorescence intensity, and XRF alone cannot calculate a quantitative value (in terms of mass %). Therefore, the metal content of the structured catalyst to which the metal was added at Si/M=100 was determined by ICP analysis, and the metal content of the structured catalyst in which the metal was added at Si/M=50 and less than 100 was calculated based on XRF measurement results and ICP measurement results.

As a result, it was confirmed that the amount of the metal embedded in the structured catalyst increased with the increase of the added amount of the metal-containing solution, at least within the range wherein the ratio of number of atoms Si/M was from 50 to 1000.

[D] Performance Evaluation

The catalytic capacity of the catalytic substances was evaluated for the catalytic structural bodies of the examples and the silicalite of the comparative examples described above. The results are shown in Tables 1 to 8.

(1) Catalytic activity

The catalytic activity was evaluated under the following conditions:

The contents of the catalytic structural bodies of Examples 1 to 384 and Comparative Examples 1 to 4 were uniformed, and 3.3 cc of the catalytic structural bodies were charged into tube-shaped reaction tubes with an inner diameter of 14 mm, and CO shift reaction was performed in a CO-containing gas ($H_2$/CO/$CO_2$=30/50/20 mol %, $H_2S$=700 ppm, S/CO=1.0) at 0.9 MPa, 250° C., and SV=6,000 $h^{-1}$. In addition, as Comparative Example 2, an experiment using only the support was performed. The CO gas flow rate of the CO-containing gas was measured using a flow microreactor apparatus, and the catalytic activity was evaluated. For the comparison of the the catalytic activity, the CO conversion ratio was calculated from the CO gas flow rate change from the catalyst layer inlet CO gas flow rate (mol/hour) to the catalyst layer outlet CO gas flow rate (mol/hour). The CO conversion ratio was determined according to Formula (I) below.

$$\text{CO conversion ratio (\%)}=(1-(\text{catalyst layer outlet CO gas flow rate (mol/hour)})/(\text{catalyst layer inlet CO gas flow rate(mol/hour)}))\times 100 \quad (I)$$

When the CO conversion ratio calculated as described above was 70% or more, the catalytic activity was judged to be particularly good and rated "A", when 60% or more and less than 70%, the catalytic activity was judged to be good and rated "B", and when 50% or more and less than 60%, the catalytic activity was judged to be acceptable and rated "C", and when less than 50%, the catalytic activity was judged to be poor and rated "D". These measurements and evaluation results are shown in Tables 1 to 8.

(2) Durability (life time)

The durability was evaluated under the following conditions:

Using the catalytic structural bodies of Examples 1 to 384, the first CO shift reaction was performed in the same manner as in (1), and the CO conversion ratio (%) was calculated. Thereafter, a CO-containing gas ($H_2$/CO/$CO_2$=30/50/20 mol %, $H_2S$=700 ppm, S/CO=1.0) was allowed to react for 10 hours under conditions of 0.9 MPa, 450° C., SV=2000 $h^{-1}$, and the second CO shift reaction was performed in the same manner as in (1), and the CO conversion ratio (%) was calculated. When the ratio of the CO conversion ratio (%) of the second CO shift reaction to the CO conversion ratio (%) of the first CO shift reaction ([CO conversion ratio of second CO shift reaction (%)/CO conversion ratio of first CO shift reaction (%)]×100) was 90% or greater, the durability was judged to be particularly good and rated "A", when 80% or greater and less than 90%, the durability was judged to be good and rated "B", when 70% or greater and less than 80%, the durability was determined to be acceptable and rated "C", and when less than 70%, the durability was determined to be poor and rated "D". These measurement and evaluation results are shown in Tables 1 to 8.

Performance evaluations similar to those of evaluation (1) and (2) above were also performed on Comparative Example 1. Note that Comparative Example 2 is the support itself, and do not contain the catalytic substance. Therefore, in the performance evaluation described above, only the support of Comparative Example 2 was charged in place of the structured catalyst. The results are shown in Table 8.

TABLE 1

| | Producing Conditions of Structured Catalyst | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (ratio of number of atoms) Si/M | Type of Structure Directing Agent | pH | Time (h) |
| Example 1 | MCM-41 | 1.3 | Yes | 1000 | TEABr | 12 | 120 |
| Example 2 | | | | 500 | | | |
| Example 3 | | | | 200 | | | |
| Example 4 | | | | 100 | | | |
| Example 5 | | 2.0 | | | | | |
| Example 6 | | 2.4 | | | | | |
| Example 7 | | 2.6 | | | | | |
| Example 8 | | 3.3 | | | | | |
| Example 9 | | 6.6 | | | | | |
| Example 10 | SBA-1 | 13.2 | | | | | |
| Example 11 | | 19.8 | | | | | |
| Example 12 | | 26.4 | | | | | |
| Example 13 | MCM-41 | 1.3 | None | 1000 | | | |
| Example 14 | | | | 500 | | | |
| Example 15 | | | | 200 | | | |
| Example 16 | | | | 100 | | | |
| Example 17 | | 2.0 | | | | | |
| Example 18 | | 2.4 | | | | | |
| Example 19 | | 2.6 | | | | | |
| Example 20 | | 3.3 | | | | | |
| Example 21 | | 6.6 | | | | | |
| Example 22 | SBA-1 | 13.2 | | | | | |
| Example 23 | | 19.8 | | | | | |
| Example 24 | | 26.4 | | | | | |
| Example 25 | MCM-41 | 1.1 | Yes | 1000 | | 11 | 72 |
| Example 26 | | | | 500 | | | |
| Example 27 | | | | 200 | | | |
| Example 28 | | | | 100 | | | |
| Example 29 | | 1.6 | | | | | |
| Example 30 | | 2.0 | | | | | |
| Example 31 | | 2.2 | | | | | |
| Example 32 | | 2.7 | | | | | |
| Example 33 | | 5.4 | | | | | |
| Example 34 | SBA-1 | 10.9 | | | | | |
| Example 35 | | 16.3 | | | | | |
| Example 36 | | 21.8 | | | | | |
| Example 37 | MCM-41 | 1.1 | None | 1000 | | | |
| Example 38 | | | | 500 | | | |
| Example 39 | | | | 200 | | | |
| Example 40 | | | | 100 | | | |
| Example 41 | | 1.6 | | | | | |
| Example 42 | | 2.0 | | | | | |
| Example 43 | | 2.2 | | | | | |
| Example 44 | | 2.7 | | | | | |
| Example 45 | | 5.4 | | | | | |
| Example 46 | SBA-1 | 10.9 | | | | | |
| Example 47 | | 16.3 | | | | | |

TABLE 1-continued

| | | | | | | | |
|---|---|---|---|---|---|---|---|
| Example 48 | | 21.8 | | | | | |

| | | Structured Catalyst | | | | | |
|---|---|---|---|---|---|---|---|
| | | Support Zeolite-Type Compound | | Catalytic Substance | | | |
| | | Average Inner Diameter of Channels | | Metal Nanoparticles Average Particle Size | | Performance Evaluation | |
| No. | Framework | $D_F$ (nm) | Type | $D_C$ (nm) | $D_C/D_F$ | Catalytic Activity | Durability |
| Example 1 | FAU | 0.74 | Co | 0.11 | 0.14 | C | C |
| Example 2 | | | | 0.32 | 0.43 | C | C |
| Example 3 | | | | 0.53 | 0.71 | B | C |
| Example 4 | | | | 1.06 | 1.43 | A | B |
| Example 5 | | | | 1.59 | 2.14 | A | B |
| Example 6 | | | | 1.90 | 2.57 | A | A |
| Example 7 | | | | 2.11 | 2.86 | A | A |
| Example 8 | | | | 2.64 | 3.57 | A | A |
| Example 9 | | | | 5.29 | 7.14 | B | A |
| Example 10 | | | | 10.57 | 14.29 | B | A |
| Example 11 | | | | 15.86 | 21.43 | C | A |
| Example 12 | | | | 21.14 | 28.57 | C | A |
| Example 13 | | | | 0.11 | 0.14 | C | C |
| Example 14 | | | | 0.32 | 0.43 | C | C |
| Example 15 | | | | 0.53 | 0.71 | B | C |
| Example 16 | | | | 1.06 | 1.43 | A | B |
| Example 17 | | | | 1.59 | 2.14 | A | B |
| Example 18 | | | | 1.90 | 2.57 | B | A |
| Example 19 | | | | 2.11 | 2.86 | B | A |
| Example 20 | | | | 2.64 | 3.57 | B | A |
| Example 21 | | | | 5.29 | 7.14 | C | A |
| Example 22 | | | | 10.57 | 14.29 | C | A |
| Example 23 | | | | 15.86 | 21.43 | C | A |
| Example 24 | | | | 21.14 | 28.57 | C | A |
| Example 25 | MTW | 0.61 | | 0.09 | 0.14 | C | C |
| Example 26 | | | | 0.26 | 0.43 | C | C |
| Example 27 | | | | 0.44 | 0.71 | B | C |
| Example 28 | | | | 0.87 | 1.43 | A | B |
| Example 29 | | | | 1.31 | 2.14 | A | B |
| Example 30 | | | | 1.57 | 2.57 | A | B |
| Example 31 | | | | 1.74 | 2.86 | A | A |
| Example 32 | | | | 2.18 | 3.57 | A | A |
| Example 33 | | | | 4.36 | 7.14 | B | A |
| Example 34 | | | | 8.71 | 14.29 | B | A |
| Example 35 | | | | 13.07 | 21.43 | C | A |
| Example 36 | | | | 17.43 | 28.57 | C | A |
| Example 37 | | | | 0.09 | 0.14 | C | C |
| Example 38 | | | | 0.26 | 0.43 | C | C |
| Example 39 | | | | 0.44 | 0.71 | B | C |
| Example 40 | | | | 0.87 | 1.43 | A | B |
| Example 41 | | | | 1.31 | 2.14 | A | B |
| Example 42 | | | | 1.57 | 2.57 | A | B |
| Example 43 | | | | 1.74 | 2.86 | B | A |
| Example 44 | | | | 2.18 | 3.57 | B | A |
| Example 45 | | | | 4.36 | 7.14 | C | A |
| Example 46 | | | | 8.71 | 14.29 | C | A |
| Example 47 | | | | 13.07 | 21.43 | C | A |
| Example 48 | | | | 17.43 | 28.57 | C | A |

TABLE 2

| | Producing Conditions of Structured Catalyst | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence of Absence of Additives | Conversion Ratio of Added Amount of Metal-containing Solution (ratio of number of atoms) Si/M | Type of Structure Directing Agent | pH | Time (h) |
| Example 49 | MCM-41 | 1.0 | Yes | 1000 | TPABr | 12 | 120 |
| Example 50 | | | | 500 | | | |
| Example 51 | | | | 200 | | | |
| Example 52 | | | | 100 | | | |
| Example 53 | | 1.5 | | | | | |
| Example 54 | | 1.8 | | | | | |
| Example 55 | | 2.0 | | | | | |
| Example 56 | | 2.5 | | | | | |
| Example 57 | | 5.0 | | | | | |
| Example 58 | SBA-1 | 10.0 | | | | | |
| Example 59 | | 15.0 | | | | | |
| Example 60 | | 20.0 | | | | | |
| Example 61 | MCM-41 | 1.0 | None | 1000 | | | |
| Example 62 | | | | 500 | | | |
| Example 63 | | | | 200 | | | |
| Example 64 | | | | 100 | | | |
| Example 65 | | 1.5 | | | | | |
| Example 66 | | 1.8 | | | | | |
| Example 67 | | 2.0 | | | | | |
| Example 68 | | 2.5 | | | | | |
| Example 69 | | 5.0 | | | | | |
| Example 70 | SBA-1 | 10.0 | | | | | |
| Example 71 | | 15.0 | | | | | |
| Example 72 | | 20.0 | | | | | |
| Example 73 | MCM-41 | 1.0 | Yes | 1000 | TMABr | 11 | 72 |
| Example 74 | | | | 500 | | | |
| Example 75 | | | | 200 | | | |
| Example 76 | | | | 100 | | | |
| Example 77 | | 1.5 | | | | | |
| Example 78 | | 1.8 | | | | | |
| Example 79 | | 2.0 | | | | | |
| Example 80 | | 2.5 | | | | | |
| Example 81 | | 5.1 | | | | | |
| Example 82 | SBA-1 | 10.0 | | | | | |
| Example 83 | | 15.3 | | | | | |
| Example 84 | | 20.4 | | | | | |
| Example 85 | MCM-41 | 1.0 | None | 1000 | | | |
| Example 86 | | | | 500 | | | |
| Example 87 | | | | 200 | | | |
| Example 88 | | | | 100 | | | |
| Example 89 | | 1.5 | | | | | |
| Example 90 | | 1.8 | | | | | |
| Example 91 | | 2.0 | | | | | |
| Example 92 | | 2.5 | | | | | |
| Example 93 | | 5.1 | | | | | |
| Example 94 | SBA-1 | 10.0 | | | | | |
| Example 95 | | 15.3 | | | | | |
| Example 96 | | 20.4 | | | | | |

| | Structured Catalyst | | | | | | |
|---|---|---|---|---|---|---|---|
| | Support Zeolite-Type Compound | | Catalytic Substance Metal Nanoparticles | | | Performance Evaluation | |
| No. | Framework | Average Inner Diameter of Channels $D_F$ (nm) | Type | Average Particle Size $D_C$ (nm) | $D_C/D_F$ | Catalytic Activity | Durability |
| Example 49 | MFI | 0.56 | Co | 0.08 | 0.14 | C | C |
| Example 50 | | | | 0.24 | 0.43 | C | C |

TABLE 2-continued

| | | | | | |
|---|---|---|---|---|---|
| Example 51 | | | 0.40 | 0.71 | B | C |
| Example 52 | | | 0.80 | 1.43 | A | B |
| Example 53 | | | 1.20 | 2.14 | A | B |
| Example 54 | | | 1.44 | 2.57 | A | A |
| Example 55 | | | 1.60 | 2.86 | A | A |
| Example 56 | | | 2.00 | 3.57 | A | A |
| Example 57 | | | 4.00 | 7.14 | B | A |
| Example 58 | | | 8.00 | 14.29 | B | A |
| Example 59 | | | 12.00 | 21.43 | C | A |
| Example 60 | | | 160 | 28.57 | C | A |
| Example 61 | | | 0.08 | 0.14 | C | C |
| Example 62 | | | 0.24 | 0.43 | C | C |
| Example 63 | | | 0.40 | 0.71 | B | C |
| Example 64 | | | 0.80 | 1.43 | A | B |
| Example 65 | | | 1.20 | 2.14 | A | B |
| Example 66 | | | 144 | 2.57 | B | A |
| Example 67 | | | 160 | 2.86 | B | A |
| Example 68 | | | 200 | 3.57 | B | A |
| Example 69 | | | 4.00 | 7.14 | C | A |
| Example 70 | | | 8.00 | 14.29 | C | A |
| Example 71 | | | 12.00 | 21.43 | C | A |
| Example 72 | | | 16.00 | 28.57 | C | A |
| Example 73 | FER | 0.57 | 0.08 | 0.14 | C | C |
| Example 74 | | | 0.24 | 0.43 | C | C |
| Example 75 | | | 0.41 | 0.71 | B | C |
| Example 76 | | | 0.81 | 1.43 | A | B |
| Example 77 | | | 1.22 | 2.14 | A | B |
| Example 78 | | | 1.47 | 2.57 | A | B |
| Example 79 | | | 1.63 | 2.86 | A | A |
| Example 80 | | | 2.04 | 3.57 | A | A |
| Example 81 | | | 4.07 | 7.14 | B | A |
| Example 82 | | | 8.14 | 14.29 | B | A |
| Example 83 | | | 12.21 | 21.43 | C | A |
| Example 84 | | | 16.29 | 28.57 | C | A |
| Example 85 | | | 0.08 | 0.14 | C | C |
| Example 86 | | | 0.24 | 0.43 | C | C |
| Example 87 | | | 0.41 | 0.71 | B | C |
| Example 88 | | | 0.81 | 1.43 | A | B |
| Example 89 | | | 1.22 | 2.14 | A | B |
| Example 90 | | | 1.47 | 2.57 | A | B |
| Example 91 | | | 1.63 | 2.86 | B | A |
| Example 92 | | | 2.04 | 3.57 | B | A |
| Example 93 | | | 4.07 | 7.14 | C | A |
| Example 94 | | | 8.14 | 14.20 | C | A |
| Example 95 | | | 12.21 | 21.43 | C | A |
| Example 96 | | | 16.29 | 28.57 | C | A |

TABLE 3

| | Producing Conditions of Structured Catalyst | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (ratio of number of atoms) Si/M | Type of Structure Directing Agent | pH | Time (h) |
| Example 97 | MCM-41 | 1.3 | Yes | 1000 | TEABr | 12 | 120 |
| Example 98 | | | | 500 | | | |
| Example 99 | | | | 200 | | | |
| Example 100 | | | | 100 | | | |
| Example 101 | | 2.0 | | | | | |
| Example 102 | | 2.4 | | | | | |
| Example 103 | | 2.6 | | | | | |
| Example 104 | | 3.3 | | | | | |
| Example 105 | | 6.6 | | | | | |
| Example 106 | SBA-1 | 13.2 | | | | | |
| Example 107 | | 19.8 | | | | | |
| Example 108 | | 26.4 | | | | | |
| Example 109 | MCM-41 | 1.3 | None | 1000 | | | |
| Example 110 | | | | 500 | | | |
| Example 111 | | | | 200 | | | |

TABLE 3-continued

| No. | Framework | | | | | | |
|---|---|---|---|---|---|---|---|
| Example 112 | | | | 100 | | | |
| Example 113 | | 2.0 | | | | | |
| Example 114 | | 2.4 | | | | | |
| Example 115 | | 2.6 | | | | | |
| Example 116 | | 3.3 | | | | | |
| Example 117 | | 6.6 | | | | | |
| Example 118 | SBA-1 | 13.2 | | | | | |
| Example 119 | | 19.8 | | | | | |
| Example 120 | | 26.4 | | | | | |
| Example 121 | MCM-41 | 1.1 | Yes | 1000 | | 11 | 72 |
| Example 122 | | | | 500 | | | |
| Example 123 | | | | 200 | | | |
| Example 124 | | | | 100 | | | |
| Example 125 | | 1.6 | | | | | |
| Example 126 | | 2.0 | | | | | |
| Example 127 | | 2.2 | | | | | |
| Example 128 | | 2.7 | | | | | |
| Example 129 | | 5.4 | | | | | |
| Example 130 | SBA-1 | 10.9 | | | | | |
| Example 131 | | 16.3 | | | | | |
| Example 132 | | 21.8 | | | | | |
| Example 133 | MCM-41 | 1.1 | None | 1000 | | | |
| Example 134 | | | | 500 | | | |
| Example 135 | | | | 200 | | | |
| Example 136 | | | | 100 | | | |
| Example 137 | | 1.6 | | | | | |
| Example 138 | | 2.0 | | | | | |
| Example 139 | | 2.2 | | | | | |
| Example 140 | | 2.7 | | | | | |
| Example 141 | | 5.4 | | | | | |
| Example 142 | SBA-1 | 10.9 | | | | | |
| Example 143 | | 16.3 | | | | | |
| Example 144 | | 21.8 | | | | | |

| | Structured Catalyst | | | | | | |
|---|---|---|---|---|---|---|---|
| | Support Zeolite-Type Compound | | Catalytic Substance Metal | | | | |
| | | Average Inner Diameter of Channels | Nanoparticles | Average Particle Size | | Performance Evaluation | |
| No. | Framework | $D_F$ (nm) | Type | $D_C$ (nm) | $D_C/D_F$ | Catalytic Activity | Durability |
| Example 97 | FAU | 0.74 | Ni | 0.11 | 0.14 | C | C |
| Example 98 | | | | 0.32 | 0.43 | C | C |
| Example 99 | | | | 0.53 | 0.71 | B | C |
| Example 100 | | | | 1.06 | 1.43 | A | B |
| Example 101 | | | | 1.59 | 2.14 | A | B |
| Example 102 | | | | 1.90 | 2.57 | A | A |
| Example 103 | | | | 2.11 | 2.86 | A | A |
| Example 104 | | | | 2.64 | 3.57 | A | A |
| Example 105 | | | | 5.29 | 7.14 | B | A |
| Example 106 | | | | 10.57 | 14.29 | B | A |
| Example 107 | | | | 15.86 | 21.43 | C | A |
| Example 108 | | | | 21.14 | 28.57 | C | A |
| Example 109 | | | | 0.11 | 0.14 | C | C |
| Example 110 | | | | 0.32 | 0.43 | C | C |
| Example 111 | | | | 0.53 | 0.71 | B | C |
| Example 112 | | | | 1.06 | 1.43 | A | B |
| Example 113 | | | | 1.59 | 2.14 | A | B |
| Example 114 | | | | 1.90 | 2.57 | B | A |
| Example 115 | | | | 2.11 | 2.86 | B | A |
| Example 116 | | | | 2.64 | 3.57 | B | A |
| Example 117 | | | | 5.29 | 7.14 | C | A |
| Example 118 | | | | 10.57 | 14.29 | C | A |
| Example 119 | | | | 15.86 | 21.43 | C | A |
| Example 120 | | | | 21.14 | 28.57 | C | A |
| Example 121 | MTW | 0.61 | | 0.09 | 0.14 | C | C |
| Example 122 | | | | 0.26 | 0.43 | C | C |
| Example 123 | | | | 0.44 | 0.71 | B | C |
| Example 124 | | | | 0.87 | 1.43 | A | B |
| Example 125 | | | | 1.31 | 2.14 | A | B |
| Example 126 | | | | 1.57 | 2.57 | A | B |
| Example 127 | | | | 1.74 | 2.86 | A | A |
| Example 128 | | | | 2.18 | 3.57 | A | A |

TABLE 3-continued

| | | | | |
|---|---|---|---|---|
| Example 129 | 4.36 | 7.14 | B | A |
| Example 130 | 8.71 | 14.29 | B | A |
| Example 131 | 13.07 | 21.43 | C | A |
| Example 132 | 17.43 | 28.57 | C | A |
| Example 133 | 0.09 | 0.14 | C | C |
| Example 134 | 0.26 | 0.43 | C | C |
| Example 135 | 0.44 | 0.71 | B | C |
| Example 136 | 0.87 | 1.43 | A | B |
| Example 137 | 1.31 | 2.14 | A | B |
| Example 138 | 1.57 | 2.57 | A | B |
| Example 139 | 1.74 | 2.86 | B | A |
| Example 140 | 2.18 | 3.57 | B | A |
| Example 141 | 4.36 | 7.14 | C | A |
| Example 142 | 8.71 | 14.29 | C | A |
| Example 143 | 13.07 | 21.43 | C | A |
| Example 144 | 17.43 | 28.57 | C | A |

TABLE 4

| | Producing Conditions of Structured Catalyst | | | | | |
|---|---|---|---|---|---|---|
| | Precursor Material (A) | | Addition to Precursor Material (A) | | Hydrothermal Treatment Conditions using Precursor Material (C) | |
| No. | Type | Pore Diameter (nm) | Presence or Absence of Additives | Conversion Ratio of Added Amount of Metal-containing Solution (ratio of number of atoms) Si/M | Type of Structure Directing Agent | pH | Time (h) |
| Example 145 | MCM-41 | 1.0 | Yes | 1000 | TPABr | 12 | 120 |
| Example 146 | | | | 500 | | | |
| Example 147 | | | | 200 | | | |
| Example 148 | | | | 100 | | | |
| Example 149 | | 1.5 | | | | | |
| Example 150 | | 1.8 | | | | | |
| Example 151 | | 2.0 | | | | | |
| Example 152 | | 2.5 | | | | | |
| Example 153 | | 5.0 | | | | | |
| Example 154 | SBA-1 | 10.0 | | | | | |
| Example 155 | | 15.0 | | | | | |
| Example 156 | | 20.0 | | | | | |
| Example 157 | MCM-41 | 1.0 | None | 1000 | | | |
| Example 158 | | | | 500 | | | |
| Example 159 | | | | 200 | | | |
| Example 160 | | | | 100 | | | |
| Example 161 | | 1.5 | | | | | |
| Example 162 | | 1.8 | | | | | |
| Example 163 | | 2.0 | | | | | |
| Example 164 | | 2.5 | | | | | |
| Example 165 | | 5.0 | | | | | |
| Example 166 | SBA-1 | 10.0 | | | | | |
| Example 167 | | 15.0 | | | | | |
| Example 168 | | 20.0 | | | | | |
| Example 169 | MCM-41 | 1.0 | Yes | 1000 | TMABr | 11 | 72 |
| Example 170 | | | | 500 | | | |
| Example 171 | | | | 200 | | | |
| Example 172 | | | | 100 | | | |
| Example 173 | | 1.5 | | | | | |
| Example 174 | | 1.8 | | | | | |
| Example 175 | | 2.0 | | | | | |
| Example 176 | | 2.5 | | | | | |
| Example 177 | | 5.1 | | | | | |
| Example 178 | SBA-1 | 10.2 | | | | | |
| Example 179 | | 15.3 | | | | | |
| Example 180 | | 20.4 | | | | | |
| Example 181 | MCM-41 | 1.0 | None | 1000 | | | |
| Example 182 | | | | 500 | | | |
| Example 183 | | | | 200 | | | |
| Example 184 | | | | 100 | | | |
| Example 185 | | 1.5 | | | | | |
| Example 186 | | 1.8 | | | | | |
| Example 187 | | 2.0 | | | | | |

TABLE 4-continued

| | | |
|---|---|---|
| Example 188 | | 2.5 |
| Example 189 | | 5.1 |
| Example 190 | SBA-1 | 10.0 |
| Example 191 | | 15.3 |
| Example 192 | | 20.4 |

| | | Structured Catalyst | | | | | |
|---|---|---|---|---|---|---|---|
| | | Support Zeolite-Type Compound | | Catalytic Substance | | | |
| | | Average Inner Diameter of Channels | | Metal Nanoparticles Average Particle Size | | Performance Evaluation | |
| No. | Framework | $D_F$ (nm) | Type | $D_C$ (nm) | $D_C/D_F$ | Catalytic Activity | Durability |
| Example 145 | MFI | 0.56 | Ni | 0.08 | 0.14 | C | C |
| Example 146 | | | | 0.24 | 0.43 | C | C |
| Example 147 | | | | 0.40 | 0.71 | B | C |
| Example 148 | | | | 0.80 | 1.43 | A | B |
| Example 149 | | | | 1.20 | 2.14 | A | B |
| Example 150 | | | | 1.44 | 2.57 | A | A |
| Example 151 | | | | 1.60 | 2.86 | A | A |
| Example 152 | | | | 2.00 | 3.57 | A | A |
| Example 153 | | | | 4.00 | 7.14 | B | A |
| Example 154 | | | | 8.00 | 14.29 | B | A |
| Example 155 | | | | 12.00 | 21.43 | C | A |
| Example 156 | | | | 16.00 | 28.57 | C | A |
| Example 157 | | | | 0.08 | 0.14 | C | C |
| Example 158 | | | | 0.24 | 0.43 | C | C |
| Example 159 | | | | 0.40 | 0.71 | B | C |
| Example 160 | | | | 0.80 | 1.43 | A | B |
| Example 161 | | | | 1.20 | 2.14 | A | B |
| Example 162 | | | | 1.44 | 2.57 | B | A |
| Example 163 | | | | 1.60 | 2.86 | B | A |
| Example 164 | | | | 2.00 | 3.57 | B | A |
| Example 165 | | | | 4.00 | 7.14 | C | A |
| Example 166 | | | | 8.00 | 14.29 | C | A |
| Example 167 | | | | 12.00 | 21.43 | C | A |
| Example 168 | | | | 16.00 | 28.57 | C | A |
| Example 169 | FER | 0.57 | | 0.08 | 0.14 | C | C |
| Example 170 | | | | 0.24 | 0.43 | C | C |
| Example 171 | | | | 0.40 | 0.71 | B | C |
| Example 172 | | | | 0.80 | 1.43 | A | B |
| Example 173 | | | | 1.20 | 2.14 | A | B |
| Example 174 | | | | 1.44 | 2.57 | A | B |
| Example 175 | | | | 1.60 | 2.86 | A | A |
| Example 176 | | | | 2.0 | 3.57 | A | A |
| Example 177 | | | | 4.00 | 7.14 | B | A |
| Example 178 | | | | 8.00 | 14.29 | B | A |
| Example 179 | | | | 12.00 | 21.43 | C | A |
| Example 180 | | | | 16.00 | 28.57 | C | A |
| Example 181 | | | | 0.08 | 0.14 | C | C |
| Example 182 | | | | 0.24 | 0.43 | C | C |
| Example 183 | | | | 0.40 | 0.71 | B | C |
| Example 184 | | | | 0.80 | 1.43 | A | B |
| Example 185 | | | | 1.20 | 2.14 | A | B |
| Example 186 | | | | 1.44 | 2.57 | A | B |
| Example 187 | | | | 1.60 | 2.86 | B | A |
| Example 188 | | | | 2.0 | 3.57 | B | A |
| Example 189 | | | | 4.00 | 7.14 | C | A |
| Example 190 | | | | 8.00 | 14.29 | C | A |
| Example 191 | | | | 12.00 | 21.43 | C | A |
| Example 192 | | | | 16.00 | 28.57 | C | A |

TABLE 5

| | Producing Conditions of Structured Catalyst | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (ratio of number of atoms) Si/M | Type of Structure Directing Agent | pH | Time (h) |
| Example 193 | MCM-41 | 1.3 | Yes | 1000 | TEABr | 12 | 120 |
| Example 194 | | | | 500 | | | |
| Example 195 | | | | 200 | | | |
| Example 196 | | | | 100 | | | |
| Example 197 | | 2.0 | | | | | |
| Example 198 | | 2.4 | | | | | |
| Example 199 | | 2.6 | | | | | |
| Example 200 | | 3.3 | | | | | |
| Example 201 | | 6.6 | | | | | |
| Example 202 | SBA-1 | 13.2 | | | | | |
| Example 203 | | 19.8 | | | | | |
| Example 204 | | 26.4 | | | | | |
| Example 205 | MCM-41 | 1.3 | None | 1000 | | | |
| Example 206 | | | | 500 | | | |
| Example 207 | | | | 200 | | | |
| Example 208 | | | | 100 | | | |
| Example 209 | | 2.0 | | | | | |
| Example 210 | | 2.4 | | | | | |
| Example 211 | | 2.6 | | | | | |
| Example 212 | | 3.3 | | | | | |
| Example 213 | | 6.6 | | | | | |
| Example 214 | SBA-1 | 13.2 | | | | | |
| Example 215 | | 19.8 | | | | | |
| Example 216 | | 26.4 | | | | | |
| Example 217 | MCM-41 | 1.1 | Yes | 1000 | | 11 | 72 |
| Example 218 | | | | 500 | | | |
| Example 219 | | | | 200 | | | |
| Example 220 | | | | 100 | | | |
| Example 221 | | 1.6 | | | | | |
| Example 222 | | 2.0 | | | | | |
| Example 223 | | 2.2 | | | | | |
| Example 224 | | 2.7 | | | | | |
| Example 225 | | 5.4 | | | | | |
| Example 226 | SBA-1 | 10.9 | | | | | |
| Example 227 | | 16.3 | | | | | |
| Example 228 | | 21.8 | | | | | |
| Example 229 | MCM-41 | 1.1 | None | 1000 | | | |
| Example 230 | | | | 500 | | | |
| Example 231 | | | | 200 | | | |
| Example 232 | | | | 100 | | | |
| Example 233 | | 1.6 | | | | | |
| Example 234 | | 2.0 | | | | | |
| Example 235 | | 2.2 | | | | | |
| Example 236 | | 2.7 | | | | | |
| Example 237 | | 5.4 | | | | | |
| Example 238 | SBA-1 | 10.9 | | | | | |
| Example 239 | | 16.3 | | | | | |
| Example 240 | | 21.8 | | | | | |

TABLE 5-continued

| | Structured Catalyst | | | | | | |
| | Support Zeolite-Type Compound | | Catalytic Substance Metal Nanoparticles | | | Performance Evaluation | |
| No. | Framework | Average Inner Diameter of Channels $D_F$ (nm) | Type | Average Particle Size $D_C$ (nm) | $D_C/D_F$ | Catalytic Activity | Durability |
| --- | --- | --- | --- | --- | --- | --- | --- |
| Example 193 | FAU | 0.74 | Fe | 0.11 | 0.14 | C | C |
| Example 194 | | | | 0.32 | 0.43 | C | C |
| Example 195 | | | | 0.53 | 0.71 | B | C |
| Example 196 | | | | 1.06 | 1.43 | A | B |
| Example 197 | | | | 1.59 | 2.14 | A | B |
| Example 198 | | | | 1.90 | 2.57 | A | A |
| Example 199 | | | | 2.11 | 2.86 | A | A |
| Example 200 | | | | 2.64 | 3.57 | A | A |
| Example 201 | | | | 5.29 | 7.14 | B | A |
| Example 202 | | | | 10.57 | 14.29 | B | A |
| Example 203 | | | | 15.86 | 21.43 | C | A |
| Example 204 | | | | 21.14 | 28.57 | C | A |
| Example 205 | | | | 0.11 | 0.14 | C | C |
| Example 206 | | | | 0.32 | 0.43 | C | C |
| Example 207 | | | | 0.53 | 0.71 | B | C |
| Example 208 | | | | 1.06 | 1.43 | A | B |
| Example 209 | | | | 1.59 | 2.14 | A | B |
| Example 210 | | | | 1.90 | 2.57 | B | A |
| Example 211 | | | | 2.11 | 2.86 | B | A |
| Example 212 | | | | 2.64 | 3.57 | B | A |
| Example 213 | | | | 5.29 | 7.14 | C | A |
| Example 214 | | | | 10.57 | 14.29 | C | A |
| Example 215 | | | | 15.86 | 21.43 | C | A |
| Example 216 | | | | 21.14 | 28.57 | C | A |
| Example 217 | MTW | 0.61 | | 0.09 | 0.14 | C | C |
| Example 218 | | | | 0.26 | 0.43 | C | C |
| Example 219 | | | | 0.44 | 0.71 | B | C |
| Example 220 | | | | 0.87 | 1.43 | A | B |
| Example 221 | | | | 1.31 | 2.14 | A | B |
| Example 222 | | | | 1.57 | 2.57 | A | B |
| Example 223 | | | | 1.74 | 2.86 | A | A |
| Example 224 | | | | 2.18 | 3.57 | A | A |
| Example 225 | | | | 4.36 | 7.14 | B | A |
| Example 226 | | | | 8.71 | 14.29 | B | A |
| Example 227 | | | | 13.07 | 21.43 | C | A |
| Example 228 | | | | 17.43 | 28.57 | C | A |
| Example 229 | | | | 0.09 | 0.14 | C | C |
| Example 230 | | | | 0.26 | 0.43 | C | C |
| Example 231 | | | | 0.44 | 0.71 | B | C |
| Example 232 | | | | 0.87 | 1.43 | A | B |
| Example 233 | | | | 1.31 | 2.14 | A | B |
| Example 234 | | | | 1.57 | 2.57 | A | B |
| Example 235 | | | | 1.74 | 2.86 | B | A |
| Example 236 | | | | 2.18 | 3.57 | B | A |
| Example 237 | | | | 4.36 | 7.14 | C | A |
| Example 238 | | | | 8.71 | 14.29 | C | A |
| Example 239 | | | | 13.07 | 21.43 | C | A |
| Example 240 | | | | 17.43 | 28.57 | C | A |

TABLE 6

| | Producing Conditions of Structured Catalyst | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (ratio of number of atoms) Si/M | Type of Structure Directing Agent | pH | Time (h) |
| Example 241 | MCM-41 | 1.0 | Yes | 1000 | TPABr | 12 | 120 |
| Example 242 | | | | 500 | | | |
| Example 243 | | | | 200 | | | |
| Example 244 | | | | 100 | | | |
| Example 245 | | 1.5 | | | | | |
| Example 246 | | 1.8 | | | | | |
| Example 247 | | 2.0 | | | | | |
| Example 248 | | 2.5 | | | | | |
| Example 249 | | 5.0 | | | | | |
| Example 250 | SBA-1 | 10.0 | | | | | |
| Example 251 | | 15.0 | | | | | |
| Example 252 | | 20.0 | | | | | |
| Example 253 | MCM-41 | 1.0 | None | 1000 | | | |
| Example 254 | | | | 500 | | | |
| Example 255 | | | | 200 | | | |
| Example 256 | | | | 100 | | | |
| Example 257 | | 1.5 | | | | | |
| Example 258 | | 1.8 | | | | | |
| Example 259 | | 2.0 | | | | | |
| Example 260 | | 2.5 | | | | | |
| Example 261 | | 5.0 | | | | | |
| Example 262 | SBA-1 | 10.0 | | | | | |
| Example 263 | | 15.0 | | | | | |
| Example 264 | | 20.0 | | | | | |
| Example 265 | MCM-41 | 1.0 | Yes | 1000 | TMABr | 11 | 72 |
| Example 266 | | | | 500 | | | |
| Example 267 | | | | 200 | | | |
| Example 268 | | | | 100 | | | |
| Example 269 | | 1.5 | | | | | |
| Example 270 | | 1.8 | | | | | |
| Example 271 | | 2.0 | | | | | |
| Example 272 | | 2.5 | | | | | |
| Example 273 | | 5.1 | | | | | |
| Example 274 | SBA-1 | 10.0 | | | | | |
| Example 275 | | 15.3 | | | | | |
| Example 276 | | 20.4 | | | | | |
| Example 277 | MCM-41 | 1.0 | None | 1000 | | | |
| Example 278 | | | | 500 | | | |
| Example 279 | | | | 200 | | | |
| Example 280 | | | | 100 | | | |
| Example 281 | | 1.5 | | | | | |
| Example 282 | | 1.8 | | | | | |
| Example 283 | | 2.0 | | | | | |
| Example 284 | | 2.5 | | | | | |
| Example 285 | | 5.1 | | | | | |
| Example 286 | SBA-1 | 10.0 | | | | | |
| Example 287 | | 15.3 | | | | | |
| Example 288 | | 20.4 | | | | | |

TABLE 6-continued

| | Structured Catalyst | | | | | |
|---|---|---|---|---|---|---|
| | Support Zeolite-Type Compound | | Catalytic Substance Metal Nanoparticles | | Performance Evaluation | |
| | | Average Inner Diameter of Channels $D_F$ | | Average Particle Size $D_C$ | Catalytic | |
| No. | Framework | (nm) | Type | (nm) | $D_C/D_F$ | Activity | Durability |
|---|---|---|---|---|---|---|---|
| Example 241 | MFI | 0.56 | Fe | 0.08 | 0.14 | C | C |
| Example 242 | | | | 0.24 | 0.43 | C | C |
| Example 243 | | | | 0.40 | 0.71 | B | C |
| Example 244 | | | | 0.80 | 1.43 | A | B |
| Example 245 | | | | 1.20 | 2.14 | A | B |
| Example 246 | | | | 1.44 | 2.57 | A | A |
| Example 247 | | | | 1.60 | 2.86 | A | A |
| Example 248 | | | | 2.00 | 3.57 | A | A |
| Example 249 | | | | 4.00 | 7.14 | B | A |
| Example 250 | | | | 8.00 | 14.29 | B | A |
| Example 251 | | | | 12.00 | 21.43 | C | A |
| Example 252 | | | | 16.00 | 28.57 | C | A |
| Example 253 | | | | 0.08 | 0.14 | C | C |
| Example 254 | | | | 0.24 | 0.43 | C | C |
| Example 255 | | | | 0.40 | 0.71 | B | C |
| Example 256 | | | | 0.80 | 1.43 | A | B |
| Example 257 | | | | 1.20 | 2.14 | A | B |
| Example 258 | | | | 1.44 | 2.57 | B | A |
| Example 259 | | | | 1.60 | 2.86 | B | A |
| Example 260 | | | | 2.00 | 3.57 | B | A |
| Example 261 | | | | 4.00 | 7.14 | C | A |
| Example 262 | | | | 8.00 | 14.29 | C | A |
| Example 263 | | | | 12.00 | 21.43 | C | A |
| Example 264 | | | | 16.00 | 28.57 | C | A |
| Example 265 | FER | 0.57 | | 0.08 | 0.14 | C | C |
| Example 266 | | | | 0.24 | 0.43 | C | C |
| Example 267 | | | | 0.41 | 0.71 | B | C |
| Example 268 | | | | 0.81 | 1.43 | A | B |
| Example 269 | | | | 1.22 | 2.14 | A | B |
| Example 270 | | | | 1.47 | 2.57 | A | A |
| Example 271 | | | | 1.63 | 2.86 | A | A |
| Example 272 | | | | 2.04 | 3.57 | A | A |
| Example 273 | | | | 4.07 | 7.14 | C | A |
| Example 274 | | | | 8.14 | 14.29 | C | A |
| Example 275 | | | | 12.21 | 21.43 | C | A |
| Example 276 | | | | 16.29 | 28.57 | C | A |
| Example 277 | | | | 0.08 | 0.14 | C | C |
| Example 278 | | | | 0.24 | 0.43 | C | C |
| Example 279 | | | | 0.41 | 0.71 | B | C |
| Example 280 | | | | 0.81 | 1.43 | A | B |
| Example 281 | | | | 1.22 | 2.14 | A | B |
| Example 282 | | | | 1.47 | 2.57 | A | B |
| Example 283 | | | | 1.63 | 2.86 | B | A |
| Example 284 | | | | 2.04 | 3.57 | B | A |
| Example 285 | | | | 4.07 | 7.14 | C | A |
| Example 286 | | | | 8.14 | 14.29 | C | A |
| Example 287 | | | | 12.21 | 21.43 | C | A |
| Example 288 | | | | 16.29 | 28.57 | C | A |

TABLE 7

| | Producing Conditions of Structured Catalyst | | | | | | |
|---|---|---|---|---|---|---|---|
| | | | Addition to Precursor Material (A) | | Hydrothermal Treatment Conditions using Precursor Material (C) | | |
| | Precursor Material (A) | | | Conversion Ratio of Added Amount of Metal-containing Solution (ratio of number of atoms) Si/M | Type of Structure Directing Agent | pH | Time (h) |
| No. | Type | Pore Diameter (nm) | Presence or Absence of Additives | | | | |
| Example 289 | MCM-41 | 1.3 | Yes | 1000 | TEABr | 12 | 120 |
| Example 290 | | | | 500 | | | |
| Example 291 | | | | 200 | | | |
| Example 292 | | | | 100 | | | |
| Example 293 | | 2.0 | | | | | |
| Example 294 | | 2.4 | | | | | |
| Example 295 | | 2.6 | | | | | |
| Example 296 | | 3.3 | | | | | |
| Example 297 | | 6.6 | | | | | |
| Example 298 | SBA-1 | 13.2 | | | | | |
| Example 299 | | 19.8 | | | | | |
| Example 300 | | 26.4 | | | | | |
| Example 301 | MCM-41 | 1.3 | None | 1000 | | | |
| Example 302 | | | | 500 | | | |
| Example 303 | | | | 200 | | | |
| Example 304 | | | | 100 | | | |
| Example 305 | | 2.0 | | | | | |
| Example 306 | | 2.4 | | | | | |
| Example 307 | | 2.6 | | | | | |
| Example 308 | | 3.3 | | | | | |
| Example 309 | | 6.6 | | | | | |
| Example 310 | SBA-1 | 13.2 | | | | | |
| Example 311 | | 19.8 | | | | | |
| Example 312 | | 26.4 | | | | | |
| Example 313 | MCM-41 | 1.1 | Yes | 1000 | | 11 | 72 |
| Example 314 | | | | 500 | | | |
| Example 315 | | | | 200 | | | |
| Example 316 | | | | 100 | | | |
| Example 317 | | 1.6 | | | | | |
| Example 318 | | 2.0 | | | | | |
| Example 319 | | 2.2 | | | | | |
| Example 320 | | 2.7 | | | | | |
| Example 321 | | 5.4 | | | | | |
| Example 322 | SBA-1 | 10.9 | | | | | |
| Example 323 | | 16.3 | | | | | |
| Example 324 | | 21.8 | | | | | |
| Example 325 | MCM-41 | 1.1 | None | 1000 | | | |
| Example 326 | | | | 500 | | | |
| Example 327 | | | | 200 | | | |
| Example 328 | | | | 100 | | | |
| Example 329 | | 1.6 | | | | | |
| Example 330 | | 2.0 | | | | | |
| Example 331 | | 2.2 | | | | | |
| Example 332 | | 2.7 | | | | | |
| Example 333 | | 5.4 | | | | | |
| Example 334 | SBA-1 | 10.9 | | | | | |
| Example 335 | | 16.3 | | | | | |
| Example 336 | | 21.8 | | | | | |

TABLE 7-continued

| | Structured Catalyst | | | | | | |
|---|---|---|---|---|---|---|---|
| | | Support Zeolite-Type Compound | | Catalytic Substance Metal Nanoparticles | | | |
| | | Average Inner Diameter of Channels | | Average Particle | | Performance Evaluation | |
| No. | Framework | $D_F$ (nm) | Type | Size $D_C$ (nm) | $D_C/D_F$ | Catalytic Activity | Durability |
| Example 289 | FAU | 0.74 | Cu | 0.11 | 0.14 | C | C |
| Example 290 | | | | 0.32 | 0.43 | C | C |
| Example 291 | | | | 0.53 | 0.71 | B | C |
| Example 292 | | | | 1.06 | 1.43 | A | B |
| Example 293 | | | | 1.59 | 2.14 | A | B |
| Example 294 | | | | 1.90 | 2.57 | A | A |
| Example 295 | | | | 2.11 | 2.86 | A | A |
| Example 296 | | | | 2.64 | 3.57 | A | A |
| Example 297 | | | | 5.29 | 7.14 | B | A |
| Example 298 | | | | 10.57 | 14.29 | B | A |
| Example 299 | | | | 15.86 | 21.43 | C | A |
| Example 300 | | | | 21.14 | 28.57 | C | A |
| Example 301 | | | | 0.11 | 0.14 | C | C |
| Example 302 | | | | 0.32 | 0.43 | C | C |
| Example 303 | | | | 0.53 | 0.71 | B | C |
| Example 304 | | | | 1.06 | 1.43 | A | B |
| Example 305 | | | | 1.59 | 2.14 | A | B |
| Example 306 | | | | 1.90 | 2.57 | B | A |
| Example 307 | | | | 2.11 | 2.86 | B | A |
| Example 308 | | | | 2.64 | 3.57 | B | A |
| Example 309 | | | | 5.29 | 7.14 | C | A |
| Example 310 | | | | 10.57 | 14.29 | C | A |
| Example 311 | | | | 15.86 | 21.43 | C | A |
| Example 312 | | | | 21.14 | 28.57 | C | A |
| Example 313 | MTW | 0.61 | | 0.09 | 0.14 | C | C |
| Example 314 | | | | 0.26 | 0.43 | C | C |
| Example 315 | | | | 0.44 | 0.71 | B | C |
| Example 316 | | | | 0.87 | 1.43 | A | B |
| Example 317 | | | | 1.31 | 2.14 | A | B |
| Example 318 | | | | 1.57 | 2.57 | A | B |
| Example 319 | | | | 1.74 | 2.86 | A | A |
| Example 320 | | | | 2.18 | 3.57 | A | A |
| Example 321 | | | | 4.36 | 7.14 | B | A |
| Example 322 | | | | 8.71 | 14.29 | B | A |
| Example 323 | | | | 13.07 | 21.43 | C | A |
| Example 324 | | | | 17.43 | 28.57 | C | A |
| Example 325 | | | | 0.09 | 0.14 | C | C |
| Example 326 | | | | 0.26 | 0.43 | C | C |
| Example 327 | | | | 0.44 | 0.71 | B | C |
| Example 328 | | | | 0.87 | 3.43 | A | B |
| Example 329 | | | | 1.31 | 2.14 | A | B |
| Example 330 | | | | 1.57 | 2.57 | A | B |
| Example 331 | | | | 1.74 | 2.86 | B | A |
| Example 332 | | | | 2.18 | 3.57 | B | A |
| Example 333 | | | | 4.36 | 7.14 | C | A |
| Example 334 | | | | 8.71 | 14.29 | C | A |
| Example 335 | | | | 13.07 | 21.43 | C | A |
| Example 336 | | | | 17.43 | 28.57 | C | A |

TABLE 8

| | Producing Conditions of Structured Catalyst | | | | | | |
|---|---|---|---|---|---|---|---|
| | Precursor Material (A) | | Addition to Precursor Material (A) | | Hydrothermal Treatment Conditions using Precursor Material (C) | | |
| No. | Type | Pore Diameter (nm) | Presence or Absence of Additives | Conversion Ratio of Added Amount of Metal-containing Solution (ratio of number of atoms) Si/M | Type of Structure Directing Agent | pH | Time (h) |
| Example 337 | MCM-41 | 1.0 | Yes | 1000 | TPABr | 12 | 120 |
| Example 338 | | | | 500 | | | |
| Example 339 | | | | 200 | | | |
| Example 340 | | | | 100 | | | |
| Example 341 | | 1.5 | | | | | |
| Example 342 | | 1.8 | | | | | |
| Example 343 | | 2.0 | | | | | |
| Example 344 | | 2.5 | | | | | |
| Example 345 | | 5.0 | | | | | |
| Example 346 | SBA-1 | 10.0 | | | | | |
| Example 347 | | 15.0 | | | | | |
| Example 348 | | 20.0 | | | | | |
| Example 349 | MCM-41 | 1.0 | None | 1000 | | | |
| Example 350 | | | | 500 | | | |
| Example 351 | | | | 200 | | | |
| Example 352 | | | | 100 | | | |
| Example 353 | | 1.5 | | | | | |
| Example 354 | | 1.8 | | | | | |
| Example 355 | | 2.0 | | | | | |
| Example 356 | | 2.5 | | | | | |
| Example 357 | | 5.0 | | | | | |
| Example 358 | SBA-1 | 10.0 | | | | | |
| Example 359 | | 15.0 | | | | | |
| Example 360 | | 20.0 | | | | | |
| Example 361 | MCM-41 | 1.0 | Yes | 1000 | TMABr | 11 | 72 |
| Example 362 | | | | 500 | | | |
| Example 363 | | | | 200 | | | |
| Example 364 | | | | 100 | | | |
| Example 365 | | 1.5 | | | | | |
| Example 366 | | 1.8 | | | | | |
| Example 367 | | 2.0 | | | | | |
| Example 368 | | 2.5 | | | | | |
| Example 369 | | 5.1 | | | | | |
| Example 370 | SBA-1 | 10.0 | | | | | |
| Example 371 | | 15.3 | | | | | |
| Example 372 | | 20.4 | | | | | |
| Example 373 | MCM-41 | 1.0 | None | 1000 | | | |
| Example 374 | | | | 500 | | | |
| Example 375 | | | | 200 | | | |
| Example 376 | | | | 100 | | | |
| Example 377 | | 1.5 | | | | | |
| Example 378 | | 1.8 | | | | | |
| Example 379 | | 2.0 | | | | | |
| Example 380 | | 2.5 | | | | | |
| Example 381 | | 5.1 | | | | | |
| Example 382 | SBA-1 | 10.0 | | | | | |
| Example 383 | | 15.3 | | | | | |
| Example 384 | | 20.4 | | | | | |
| Comparative Example 1 | | | | — | | | |
| Comparative Example 2 | | | | — | | | |

TABLE 8-continued

| | Structured Catalyst | | | | | | |
|---|---|---|---|---|---|---|---|
| | Support Zeolite-Type Compound | | Catalytic Substance Metal Nanoparticles | | | Performance Evaluation | |
| | | Average Inner Diameter of Channels | | Average Particle Size $D_C$ | | | |
| No. | Framework | $D_F$ (nm) | Type | (nm) | $D_C/D_F$ | Catalytic Activity | Durability |
| Example 337 | MFI | 0.56 | Cu | 0.08 | 0.14 | C | C |
| Example 338 | | | | 0.24 | 0.43 | C | C |
| Example 339 | | | | 0.40 | 0.71 | B | C |
| Example 340 | | | | 0.80 | 1.43 | A | B |
| Example 341 | | | | 1.20 | 2.14 | A | B |
| Example 342 | | | | 1.44 | 2.57 | A | A |
| Example 343 | | | | 1.60 | 2.86 | A | A |
| Example 344 | | | | 2.00 | 3.57 | A | A |
| Example 345 | | | | 4.00 | 7.14 | B | A |
| Example 346 | | | | 8.00 | 14.29 | B | A |
| Example 347 | | | | 12.00 | 21.43 | C | A |
| Example 348 | | | | 16.00 | 28.57 | C | A |
| Example 349 | | | | 0.08 | 0.14 | C | C |
| Example 350 | | | | 0.24 | 0.43 | C | C |
| Example 351 | | | | 0.40 | 0.71 | B | C |
| Example 352 | | | | 0.80 | 1.43 | A | B |
| Example 353 | | | | 1.20 | 2.14 | A | B |
| Example 354 | | | | 1.44 | 2.57 | B | A |
| Example 355 | | | | 1.60 | 2.86 | B | A |
| Example 356 | | | | 2.00 | 3.57 | B | A |
| Example 357 | | | | 4.00 | 7.14 | C | A |
| Example 358 | | | | 8.00 | 14.29 | C | A |
| Example 359 | | | | 12.00 | 21.43 | C | A |
| Example 360 | | | | 16.00 | 28.57 | C | A |
| Example 361 | PER | 0.57 | | 0.08 | 0.14 | C | C |
| Example 362 | | | | 0.24 | 0.43 | C | C |
| Example 363 | | | | 0.41 | 0.71 | B | C |
| Example 364 | | | | 0.81 | 1.43 | A | B |
| Example 365 | | | | 1.22 | 2.14 | A | B |
| Example 366 | | | | 1.47 | 2.57 | A | B |
| Example 367 | | | | 1.63 | 2.86 | A | A |
| Example 368 | | | | 2.04 | 3.57 | A | A |
| Example 369 | | | | 4.07 | 7.14 | B | A |
| Example 370 | | | | 8.14 | 14.29 | B | A |
| Example 371 | | | | 12.21 | 21.43 | C | A |
| Example 372 | | | | 16.29 | 28.57 | C | A |
| Example 373 | | | | 0.08 | 0.14 | C | C |
| Example 374 | | | | 0.24 | 0.43 | C | C |
| Example 375 | | | | 0.41 | 0.71 | B | C |
| Example 376 | | | | 0.81 | 1.43 | A | B |
| Example 377 | | | | 1.22 | 2.14 | A | B |
| Example 378 | | | | 1.47 | 2.57 | A | B |
| Example 379 | | | | 1.63 | 2.86 | B | A |
| Example 380 | | | | 2.04 | 3.57 | B | A |
| Example 381 | | | | 4.07 | 7.14 | C | A |
| Example 382 | | | | 8.14 | 14.29 | C | A |
| Example 383 | | | | 12.21 | 21.43 | C | A |
| Example 384 | | | | 16.29 | 28.57 | C | A |
| Comparative Example 1 | MFI Type Silicalite | 0.56 | Co | ≤50 | ≤67.6 | C | D |
| Comparative Example 2 | I Type Silicalite | 0.56 | — | — | — | D | D |

As can be seen from Tables 1 to 8, the structured catalyst (Examples 1 to 384), which was confirmed by cross sectional observation to hold the catalyst substance inside the support was found to exhibit excellent catalytic activity in the CO shift reaction and excellent durability as a catalyst compared to the structured catalyst in which the catalytic substance is simply adhered to the outer surface of the support (Comparative Example 1) or the support without any catalytic substances (Comparative Example 2).

In addition, the relationship between the amount of metal (mass %) that was embedded in the support of the structured catalyst measured in evaluation [C] above and the catalytic activity of evaluation (1) described above was evaluated. The evaluation method was the same as the evaluation method performed in "(1) catalytic activity" in the [D] "performance evaluation" described above. As a result, in each Example, when the value obtained by converting the added amount of the metal-containing solution added to the precursor material (A) to the ratio of number of atoms Si/M (M=Fe) is from 50 to 200 (the content of the metal element (M) of metal nanoparticles relative to the structured catalyst is from 0.5 to 2.5 mass %), the catalytic activity in the CO shift reaction was found to tend to increase.

The catalytic activity in the reverse shift reaction was evaluated under the following conditions:

Of the Examples shown in Table 1 to 8, as a typical example, 70 mg of the structured catalyst in which both the catalytic activity and heat resistance were rated "A" was charged into a normal pressure flow reactor, and the reaction gas ($CO_2:H_2=1:2$) was fed at SV=2000 $h^{-1}$) was fed at SV=2000 h−1, and a reverse shift reaction was performed under heating at 100 to 800° C. The normal pressure flow reactor was single microreactor (Rx-3050SR, available from Frontier Laboratories Ltd.).

After completion of the reaction, the generated gas that was collected was analyzed by gas chromatography mass spectrometry (GC/MS) for the composition. Note that, as the analysis device, TRACE 1310 GC (available from Thermo Fisher Scientific Inc., detector: thermal conductivity detector) was used.

Furthermore, the product obtained by the reverse shift reaction was confirmed based on the results of the component analysis described above. In this evaluation, the above operations were performed using the catalytic structural bodies obtained in the Examples shown in Table 9, and judgement was performed using the following evaluation criteria.

When generation of carbon monoxide and water (water vapor) was confirmed at lower than 400° C. (in other words, when the reaction initiation temperature was lower than 400° C.), the catalytic activity in the reverse shift reaction was judged to be excellent and rated "A", when generation of carbon monoxide and water (water vapor) was confirmed at lower than 600° C. (in other words, when the reaction initiation temperature was 400° C. or higher and lower than 600° C.), the catalytic activity was determined to be good and rated "C", and when generation of carbon monoxide and water (water vapor) was confirmed at 600° C. or higher (in other words, when the reaction initiation temperature was 600° C. or higher) or no reverse shift reaction occurred, the catalytic activity was determined to be poor (unacceptable) and rated "D".

Furthermore, in the product obtained by the reverse shift reaction, the presence or absence of generation of methane ($CH_4$) as a by-product was confirmed based on the results of the above-described component analysis. The case where the generation of methane was not confirmed was rated "A", and the case where the generation of methane was confirmed was rated "D". These evaluation results are shown in Table 9.

TABLE 9

| | | Structured Catalyst | | | | | | | |
|---|---|---|---|---|---|---|---|---|---|
| | | Support Zeolite-Type Compound | | Catalytic Substance | | | | | |
| | | Average Inner Diameter of Channels | | Metal Nanoparticles | | | Evaluation of CO Shift Reaction Performance | | Evaluation of Reverse Sift Reaction Performance |
| No. | Framework | $D_F$ (nm) | Type | Average Particle Size $D_C$ (nm) | $D_C/D_F$ | Catalytic ACtivity | Durability | Catalytic Activity | Generation of Methane |
| Example 6 | FAU | 0.74 | Co | 1.59 | 2.14 | A | A | C | D |
| Example 7 | | | | 1.90 | 2.57 | A | A | C | D |
| Example 8 | | | | 2.31 | 2.86 | A | A | C | D |
| Example 31 | MTW | 0.61 | | 1.74 | 2.86 | A | A | C | D |
| Example 32 | | | | 2.18 | 3.57 | A | A | C | D |
| Example 54 | MFI | 0.56 | | 1.14 | 2.57 | A | A | C | D |
| Example 55 | | | | 1.60 | 2.86 | A | A | C | D |
| Example 56 | | | | 2.00 | 3.57 | A | A | C | D |
| Example 79 | FER | 0.57 | | 1.63 | 2.86 | A | A | C | D |
| Example 80 | | | | 2.04 | 3.57 | A | A | C | D |
| Example 102 | FAU | 0.74 | Ni | 1.90 | 2.57 | A | A | C | D |
| Example 103 | | | | 2.11 | 2.86 | A | A | C | D |
| Example 104 | | | | 2.64 | 3.57 | A | A | C | D |
| Example 127 | MTW | 0.61 | | 1.74 | 2.86 | A | A | C | D |
| Example 128 | | | | 2.18 | 3.57 | A | A | C | D |
| Example 150 | MFI | 0.56 | | 1.44 | 2.57 | A | A | C | D |
| Example 151 | | | | 1.60 | 2.86 | A | A | C | D |
| Example 152 | | | | 2.00 | 3.57 | A | A | C | D |
| Example 175 | FER | 0.57 | | 1.63 | 2.86 | A | A | C | D |
| Example 176 | | | | 2.04 | 3.57 | A | A | C | D |
| Example 198 | FAU | 0.74 | Fe | 1.90 | 2.57 | A | A | C | B |
| Example 199 | | | | 2.11 | 2.86 | A | A | C | B |
| Example 200 | | | | 2.64 | 3.57 | A | A | C | B |
| Example 223 | MTW | 0.61 | | 1.74 | 2.86 | A | A | C | B |
| Example 224 | | | | 2.18 | 3.57 | A | A | C | B |
| Example 246 | MFI | 0.56 | | 1.44 | 2.57 | A | A | C | B |
| Example 247 | | | | 1.60 | 2.86 | A | A | C | B |
| Example 248 | | | | 2.00 | 3.57 | A | A | C | B |
| Example 271 | FER | 0.57 | | 1.63 | 2.86 | A | A | C | B |
| Example 272 | | | | 2.04 | 3.57 | A | A | C | B |

TABLE 9-continued

| | Structured Catalyst | | | | | | | |
|---|---|---|---|---|---|---|---|---|
| | Support Zeolite-Type Compound | | Catalytic Substance | | | Evaluation of CO Shift Reaction Performance | | Evaluation of Reverse Sift Reaction Performance | |
| | | Average Inner Diameter of Channels $D_F$ | Metal Nanoparticles | Average Particle Size $D_C$ | | | | |
| No. | Framework | (nm) | Type | (nm) | $D_C/D_F$ | Catalytic Activity | Durability | Catalytic Activity | Generation of Methane |
| Example 294 | FAU | 0.74 | Cu | 1.90 | 2.57 | A | A | B | B |
| Example 295 | | | | 2.11 | 2.86 | A | A | B | B |
| Example 296 | | | | 2.64 | 3.57 | A | A | B | B |
| Example 319 | MTW | 0.61 | | 1.74 | 2.86 | A | A | B | B |
| Example 320 | | | | 2.18 | 3.57 | A | A | B | B |
| Example 342 | MFI | 0.56 | | 1.44 | 2.57 | A | A | B | B |
| Example 343 | | | | 1.60 | 2.86 | A | A | B | B |
| Example 344 | | | | 2.00 | 3.57 | A | A | B | B |
| Example 367 | FER | 0.57 | | 1.63 | 2.86 | A | A | B | B |
| Example 368 | | | | 2.04 | 3.57 | A | A | B | B |

As is evident from Table 9, the catalytic structural bodies of each example shown in Table 9 had good catalytic activity in the reverse shift reaction, in particular the catalytic structural bodies of Examples 294, 295, 296, 319, 320, 342, 343, 344, 367 and 368 had excellent catalytic activity in the reverse shift reaction. From this finding, the catalytic structural bodies of the examples shown in Table 9 were found to perform a reverse shift reaction at a lower temperature than prior art, and exhibit excellent catalytic performance. Furthermore, the catalytic structural bodies of Examples 198, 199, 200, 223, 224, 246, 247, 248, 271, 272, 294, 295, 296, 319, 320, 342, 343, 344, 367 and 368 exhibited no generation of methane, which is a by-product, and thus performed more efficient reverse shift reaction.

On the other hand, although the structured catalyst of Comparative Example 1 in which the catalytic substance was attached only to the outer surface of the support, the catalytic activity in the CO shift reaction was improved compared to the support itself having no catalytic substance of Comparative Example 21, but exhibited inferior durability as a catalyst compared to the catalytic structural bodies of Examples 1 to 384.

From the above results, it is presumed that that the structured catalyst for CO shift and the structured catalyst for reverse shift according to the present disclosure exhibit excellent catalytic activity in the CO shift reaction and the reverse shift reaction, and have excellent durability as a catalyst.

Other Embodiments

A method for using a structured catalyst for CO shift or reverse shift, in which the CO shift or reverse shift structural body includes a support of a porous structure composed of a zeolite-type compound and at least one type of metal nanoparticles present in the support, the support has channels connecting with each other, and the metal nanoparticles are present in at least an enlarged pore portion of the channels.

REFERENCE SIGNS LIST 1 structured catalyst for CO shift, structured catalyst for reverse shift
2 structured catalyst for CO shift, structured catalyst for reverse shift
10 Support
10a Outer surface
11 Channel
11a Pore
12 Enlarged pore portion
20 CO shift catalytic substance, reverse shift catalytic substance
30 CO Shift catalytic substance, reverse shift catalytic substance
$D_C$ Average particle size
$D_F$ Average inner diameter
$D_E$ Inner diameter

What is claimed is:

1. A structured catalyst for CO shift or reverse shift, comprising:
a support of a porous structure composed of a zeolite-type compound; and
at least one CO shift or reverse shift catalytic substance present in the support, wherein
the support has channels connecting with each other, and the CO shift or reverse shift catalytic substance is present at least in the channels of the support,
wherein
the channels have any one of a one-dimensional pore, a two-dimensional pore, and a three-dimensional pore defined by a framework of the zeolite-type compound and an enlarged pore portion different from any of the one-dimensional pore, the two-dimensional pore, and the three-dimensional pore,
the CO shift or reverse shift catalytic substance is present at least in the enlarged pore portion,
a diameter of CO shift or reverse shift catalytic substance is greater than a pore diameter of the zeolite-type compound, and the enlarged pore portion is a new skeletal structure providing support for the structured catalyst for CO shift or reverse shift.

2. The structured catalyst for CO shift or reverse shift according to claim 1, wherein the enlarged pore portion causes a plurality of pores constituting any one of the one-dimensional pore, the two-dimensional pore, and the three-dimensional pore to connect with each other.

3. The structured catalyst for CO shift or reverse shift according to claim 1, wherein the CO shift or reverse shift catalytic substance is made of metal nanoparticles.

4. The structured catalyst for CO shift or reverse shift according to claim 3, wherein the metal nanoparticles are nanoparticles composed of at least one type of metal or metal oxide selected from the group consisting of cobalt, nickel, iron, and copper.

5. The structured catalyst for CO shift or reverse shift according to claim 3, wherein the average particle size of the metal nanoparticles is greater than an average inner diameter of the channels and is less than or equal to the inner diameter of the enlarged pore portion.

6. The structured catalyst for CO shift or reverse shift according to claim 3, wherein a metal element (M) of the metal nanoparticles is contained in an amount from 0.5 mass % to 2.5 mass % based on the structured catalyst for CO shift or reverse shift.

7. The structured catalyst for CO shift or reverse shift according to claim 3, wherein the average particle size of the metal nanoparticles is from 0.08 nm to 30 nm.

8. The structured catalyst for CO shift or reverse shift according to claim 3, wherein the ratio of the average particle size of the metal nanoparticles to the average inner diameter of the channels is from 0.05 to 300.

9. The structured catalyst for CO shift or reverse shift according to claim 1, further comprising at least one another CO shift or reverse shift catalytic substance held on an outer surface of the support.

10. The structured catalyst for CO shift or reverse shift according to claim 9, wherein the content of the at least one CO shift or reverse shift catalytic substance present in the support is greater than that of the at least other one CO shift or reverse shift catalytic substance held on an outer surface of the support.

11. A method for producing carbon dioxide and hydrogen, the method comprising:
reacting carbon monoxide and water in the presence of the structured catalyst for CO shift according to claim 1 to generate carbon dioxide and hydrogen.

12. A method for producing carbon monoxide and water, the method comprising:
reacting carbon dioxide and hydrogen in the presence of the structured catalyst for reverse shift described in claim 1 to generate carbon monoxide and water.

13. A method for producing carbon dioxide and hydrogen, the method comprising:
reacting carbon monoxide and water using a catalyst to produce carbon dioxide and hydrogen using a CO shift reaction,
wherein
the catalyst comprises:
a support of a porous structure composed of a zeolite-type compound; and
at least one type of metal nanoparticles present in the support, wherein
the support has channels connecting with each other,
the metal nanoparticles include a structured catalyst for CO shift present in at least an enlarged pore portion of the channels, and a diameter of the metal nanoparticles are greater than a pore diameter of the zeolite-type compound, and
the enlarged pore portion is a new skeletal structure providing support for the structured catalyst for CO shift or reverse shift.

14. The method according to claim 13, further comprising:
controlling a reaction temperature to be 150 to 300° C. and a reaction pressure to be 1 to 100 atmospheres.

15. A method of producing carbon monoxide and water, the method comprising:
reacting carbon dioxide and hydrogen using a catalyst to generate carbon monoxide and water using a reverse shift reaction,
wherein
the catalyst comprising:
a support of a porous structure composed of a zeolite-type compound; and
at least one type of metal nanoparticles present in the support, wherein
the support has channels connecting with each other,
the metal nanoparticles include a structured catalyst for reverse shift present in at least an enlarged pore portion of the channels, a diameter of the metal nanoparticles are greater than a pore diameter of the zeolite-type compound, wherein the enlarged pore portion is a new skeletal structure providing support for the structured catalyst for CO shift or reverse shift.

16. The method according to claim 15, wherein a reaction temperature of the reverse shift reaction is 300° C. or higher and 900° C. or lower.

17. The method according to claim 15, further comprising:
removing unreacted carbon dioxide and generated water.

* * * * *